United States Patent
Deb et al.

(10) Patent No.: US 10,757,009 B2
(45) Date of Patent: Aug. 25, 2020

(54) GLOBAL-SCALE CONNECTIVITY USING SCALABLE VIRTUAL TRAFFIC HUBS

(71) Applicant: Amazon Technologies, Inc., Seattle, WA (US)

(72) Inventors: Bashuman Deb, Aldie, VA (US); Paul John Tillotson, Herndon, VA (US); Thomas Nguyen Spendley, Rockville, MD (US); Omer Hashmi, Chevy Chase, MD (US); Baihu Qian, Herndon, VA (US); Mohamed Nader Farahat Hassan, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 88 days.

(21) Appl. No.: 16/196,717

(22) Filed: Nov. 20, 2018

(65) Prior Publication Data
US 2020/0162362 A1    May 21, 2020

(51) Int. Cl.
*H04L 12/715* (2013.01)
*H04L 12/721* (2013.01)

(52) U.S. Cl.
CPC ............ *H04L 45/04* (2013.01); *H04L 45/124* (2013.01); *H04L 45/46* (2013.01)

(58) Field of Classification Search
None
See application file for complete search history.

(56) References Cited

U.S. PATENT DOCUMENTS

| | | | |
|---|---|---|---|
| 6,993,021 B1 | 1/2006 | Chuah et al. | |
| 7,468,956 B1* | 12/2008 | Leelanivas | H04L 12/4675 370/255 |
| 7,782,782 B1 | 8/2010 | Ferguson et al. | |
| 7,865,586 B2 | 1/2011 | Cohn | |
| 8,244,909 B1 | 8/2012 | Hanson et al. | |
| 8,331,371 B2 | 12/2012 | Judge et al. | |
| 8,358,658 B2 | 1/2013 | Flynn et al. | |
| 8,478,896 B2 | 7/2013 | Ehlers | |
| 8,693,470 B1 | 4/2014 | Maxwell et al. | |
| 10,263,840 B2* | 4/2019 | Mudigonda | H04L 41/0806 |
| 2005/0152284 A1* | 7/2005 | Kotha | H04L 12/4641 370/254 |
| 2008/0225875 A1 | 9/2008 | Wray et al. | |
| 2009/0304004 A1* | 12/2009 | Huynh Van | H04L 45/00 370/395.31 |

(Continued)

OTHER PUBLICATIONS

Albert Greenberg, et al "VL2: A Scalable and Flexible Data Center Network" Communications of the ACM, vol. 54, No. 3, Mar. 2011, pp. 1-10.

(Continued)

*Primary Examiner* — Otis L Thompson, Jr.
(74) *Attorney, Agent, or Firm* — Robert C. Kowert; Kowert, Hood, Munyon, Rankin & Goetzel, P.C.

(57) ABSTRACT

Network pathways are identified to transfer packets between a pair of regional virtual traffic hubs of a provider network. At a first hub of the pair, a first action is performed, resulting in a transmission of a packet received from a first isolated network to the second hub along a pathway selected using dynamic routing parameters. At the second hub, a second action is performed, resulting in the transmission of the packet to a destination within a second isolated network.

20 Claims, 19 Drawing Sheets

(56) References Cited

U.S. PATENT DOCUMENTS

| | | | | |
|---|---|---|---|---|
| 2010/0040069 | A1* | 2/2010 | Johri | H04L 45/04 370/400 |
| 2010/0309839 | A1* | 12/2010 | Goldshtein | H04B 7/18582 370/316 |
| 2015/0271268 | A1* | 9/2015 | Finkelstein | H04L 45/64 370/400 |
| 2016/0261506 | A1* | 9/2016 | Hegde | H04L 47/125 |
| 2019/0026082 | A1* | 1/2019 | Shalev | G06F 16/955 |
| 2019/0052604 | A1* | 2/2019 | Coleman | G06F 21/53 |
| 2019/0230030 | A1* | 7/2019 | Eswara | H04L 63/0428 |
| 2020/0092193 | A1* | 3/2020 | Tillotson | H04L 45/586 |
| 2020/0092194 | A1* | 3/2020 | Tillotson | H04L 45/306 |
| 2020/0092201 | A1* | 3/2020 | Tillotson | H04L 49/354 |
| 2020/0092252 | A1* | 3/2020 | Tillotson | H04L 61/3025 |

OTHER PUBLICATIONS

Chuanxiong Guo, et al "BCube: A High Performance, Server-centric Network Architecture for Modular Data Centers" SIGCOMM'09 Aug. 17-21, pp. 1-12.
"On the Impact of Packet Spraying in Data Center Networks", Advait Dixit, et al., 2013, pp. 1-9.
U.S. Appl. No. 16/136,142, filed Sep. 19, 2018, Paul John Tillotson.
U.S. Appl. No. 16/136,138, filed Sep. 19, 2018, Paul John Tillotson.
U.S. Appl. No. 16/136,137, filed Sep. 19, 2018, Paul John Tillotson.
U.S. Appl. No. 16/136,133, filed Sep. 19, 2018, Paul John Tillotson.
U.S. Appl. No. 16/136,131, filed Sep. 19, 2018, Paul John Tillotson.
U.S. Appl. No. 16/196,691, filed Nov. 20, 2018, Paul John Tillotson.
U.S. Appl. No. 16/196,709, filed Nov. 20, 2018, Bashuman Deb.

\* cited by examiner

GLOBAL-SCALE CONNECTIVITY USING SCALABLE VIRTUAL TRAFFIC HUBS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

As demand for virtualization-based services at provider networks has grown, more and more networking and inter-connectivity-related features may have to be added to meet the requirements of applications being implemented using the services. Many such features may require network packet address manipulation in one form or another, e.g., at level 3 or level 4 of the open systems interconnect stack. Some clients of virtualized computing services may wish to employ customized policy-based packet processing for application traffic flowing between specific sets of endpoints. Using ad-hoc solutions for all the different types of packet transformation requirements may not scale in large provider networks at which the traffic associated with hundreds of thousands of virtual or physical machines may be processed concurrently.

Figure 1:
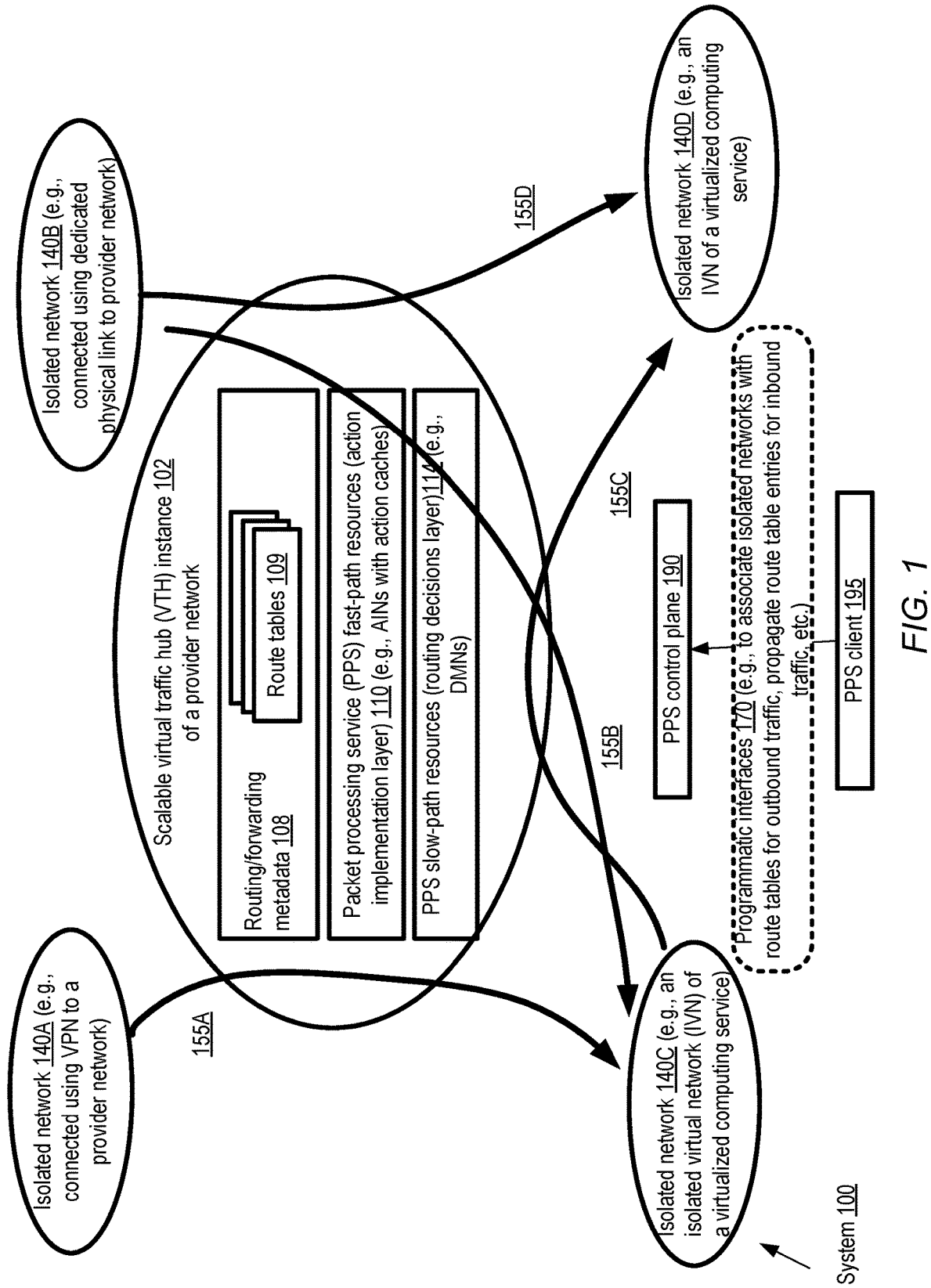
FIG. 1 illustrates an example system environment in which multiple route tables may be employed at scalable virtual hubs of a packet processing service to implement a variety of networking applications, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for supporting connectivity among isolated networks associated with a provider network using a combination of several different route tables and scalable virtual traffic hubs, and for providing global-scale connectivity using scalable virtual traffic hubs, are described. In at least some embodiments, a multi-layer packet processing service (PPS) comprising a plurality of logically isolated cells may be used as the underlying framework for the virtual traffic hubs. Virtual traffic hubs (VTHs), as suggested by the name, may serve as hubs set up on behalf of respective customers or clients of the provider network, to which several different types of isolated networks may be programmatically attached in a hub-and-spoke configuration in various embodiments, such that the routing/forwarding of network packets from one attached isolated network to another is managed by nodes of a VTH based on metadata and/or policies provided by the customers. VTHs may also be referred to as transit gateways in some embodiments.

The isolated networks attached to a VTH may, for example, include isolated virtual networks (IVNs) comprising virtual machines set up on behalf of the client using resources within data centers of the provider network, and/or networks set up at premises external to the provider network (e.g., at client-owned premises or client-managed data centers) and connected to the provider network via custom dedicated physical links or VPN (Virtual Private Network) tunnels in various embodiments. Such networks may be designated as "isolated" networks because, for example, at least some network configuration settings (e.g., network addresses assigned to resources within a given network, subnet configurations, security settings and the like) may be set independently for the different networks, without having to take other networks' configuration settings into account. For example, a range of private network addresses selected for resources within one isolated network may happen to overlap with a range of private network addresses selected for resources within another isolated network in various embodiments, since the two address ranges are selected independently. According to some embodiments, the metadata taken into consideration at a given VTH set up on behalf of a given client to manage traffic flowing between various isolated networks may include multiple route tables provided by the client (and/or route tables generated at the VTH based on other input provided by the client, such as forwarding information base (FIB) entries from which route table entries may be derived.)

In some embodiments, an indication may be obtained at one or more computing devices of a PPS, e.g., via a first programmatic interface, that at least a subset of network packets originating at one or more endpoints within a first isolated network are to be routed to one or more destinations using a first route table of a first virtual traffic hub (VTH). The VTH may comprise an action implementation layer (e.g., with one or more action implementation nodes of a particular cell of the PPS) and a routing decisions layer (e.g., with one or more decision master nodes of the particular cell) in various embodiments. As such, the first route table, which may correspond to a first routing domain managed using the first VTH, may be designated as the table to be used for routing outbound packets from the first isolated network. The action implementation nodes (AINs) may be responsible for implementing or executing routing actions in such embodiments; the actions may be generated at the decision master nodes (DMNs) based at least in part on contents of one or more route tables of the first VTH, including the first route table. Individual ones of the actions may, for example, be generated for one or more packets of a particular "flow", where one flow may be distinguished from another by some combination of properties including source and destination IP (Internet Protocol) addresses, source and destination ports, and the like.

An indication may also be received, e.g., via one or more other programmatic interfaces, that a set of one or more route table entries is to be included within a second route table of the VTH in some embodiments. This set of route table entries may indicate destination endpoints within the first isolated network, and may thus be used to route packets to the first isolated network, e.g., from a second isolated network (in contrast to the first route table, whose entries may be used to route outbound packets from the first isolated network). The second route table may correspond to a second routing domain managed using the first VTH. Thus, at least two types of actions may be implemented with respect to route tables and isolated networks that are programmatically attached to a given VTH in at least some embodiments: (a) a given route table RT1 may be programmatically associated with a given isolated network IN1 for routing at least some outbound packets from the isolated network, e.g., packets to be sent to other isolated networks attached to the VTH and (b) route table entries to be used for routing packets (e.g., originating at other isolated networks attached to the VTH) to the given isolated network IN1 may be programmatically propagated to one or more other route tables (e.g., RT2).

After the appropriate route tables have been associated and populated with entries, traffic may be allowed to start flowing between the isolated networks via the first VTH in various embodiments. For example, in one embodiment one or more action implementation nodes of the first VTH may implement a first routing action, resulting in a transmission of a first network packet to a first destination endpoint within a third isolated network. The first packet may originate at a first source endpoint in the first isolated network, and the first routing action may have been generated at the one or more decision master nodes of the first VTH based at least in part on one or more entries of the first routing table. Another routing action may be performed at the one or more action implementation nodes of the first VTH in some embodiments, which results in a transmission of a second packet to a first destination endpoint within the first isolated network. The second packet, for example, originate at a second source endpoint in the second isolated network, and the second routing action may have been generated at the one or more decision master nodes of the first VTH based at least in part on one or more entries of the second routing table.

A number of different connectivity patterns or use cases may be supported using one or more route tables of a given VTH in different embodiments as discussed below in further detail. In one embodiment, from among a number of isolated networks attached to a VTH, one or more silos or sub-groups of isolated networks (with corresponding route tables per sub-group) may be configured, such that network traffic flows only within a given sub-group and not across sub-group boundaries. In such an example scenario, four isolated networks IN1, IN2, IN3 and IN4 may be programmatically attached to a VTH VTH1, with route table RT1 being used for traffic in either direction between IN1 and IN2, and route table RT2 being used for traffic in either direction between IN3 and IN4. RT1 may only include entries pertaining to IN1 and IN2 (with no entries with sources or destinations in IN3 or IN4), while RT2 may only comprise entries pertaining to IN3 and IN4 (with no entries with sources or destinations in IN1 or IN2) in this example.

In another example scenario, traffic flowing between a first isolated network IN1 and a second isolated network IN2 may be transparently logged at an intermediary device within a third isolated network IN3 using multiple route tables of a VTH to which IN1, IN2 and IN3 are attached. For example, actions generated based on contents of one route table RT1, used for outbound traffic from IN1, may result in the transmission or diversion of packets (whose destination addresses are in IN2) to a security appliance or processing engine within IN3, where a respective log record corresponding to one or more of the packets may be stored; and actions generated using contents of a second route table RT2, used for outbound traffic from the security appliance, may be used to route the packets to their original intended destinations within IN2.

In at least some embodiments, multiple route tables may be used to efficiently manage the flow of traffic to/from external isolated networks (e.g., networks set up at data centers external to the provider network at which the VTHs and underlying packet processing service are implemented) that are connected to isolated virtual networks (IVNs) within a provider network via a set of edge devices. An edge device may, for example, comprise a gateway or other intermediary responsible for performing tasks such as address translation, encapsulation protocol processing and the like for traffic that is entering/exiting the provider network in various embodiments. A customer of the provider network may, for example, based on the requirements of one or more applications, wish to utilize an edge device for traffic between one or more IVNs and endpoints within external networks, while preventing traffic from flowing between the IVNs themselves. At least in one embodiment, an edge-adjacent route table EART1 of a VTH may be used to store entries that can be used to direct traffic to several different IVNs from one or more external isolated networks, while an IVN-adjacent route table IART1 of the VTH may be used to direct outbound traffic from the IVNs to the external isolated networks. In such a configuration, as per the connectivity requirements of the customer on whose behalf the IVNs and the VTH are set up, traffic may be directed via the VTH from any given IVN to an external network, and from an external network to a given IVN, while traffic may not flow between the different IVNs. Other types of connectivity patterns may also be made possible using multiple routing tables of a single VTH in different embodiments.

In some embodiments the packet processing service (PPS) whose action implementation nodes and decision master nodes are used to implement virtual traffic hubs (VTHs) may be part of a suite of services of a geographically distributed or dispersed provider network. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. A provider network may comprise numerous data centers in various locations of cities, states and countries around the world in various embodiments. In at least some embodiments, the provider network may be organized as a plurality of regional resource collections including a first regional resource collection and a second regional resource collection. An individual regional resource collection (which may simply be referred to as a "region" of the provider network in some embodiments) may include resources located at a particular set of one or more data centers that are located relatively close to one another, thus enabling fairly low latencies for communications among the resources of the collection. For at least some types of operations that can be requested via programmatic interfaces by clients of the provider network, including for example the establishment of a VTH, the launching of a virtual machine, etc., a client's request may (at least by default) initially be directed to provider network servers within a data center in a "home" region that is geographically (and/or in network distance) close to the device from which the request is submitted. In various embodiments, individual ones of at least some of the VTHs of a PPS may have respective home RRCs—e.g., a given VTH may at least initially be implemented using resources of a single RRC. Such VTHs may be referred to as regional or region-level VTHs.

In some embodiments, some clients may be able to perform all their provider-network based tasks using a single regional resource collection (RRC). Other clients, such as multi-national organizations or organizations whose operations and employees are distributed widely across a given country, may, however, need to utilize resources within multiple RRCs. To accommodate such clients, in various embodiments, redundant pathways may be identified between respective virtual traffic hubs set up in different RRCs, and dynamic routing parameters may be employed to direct network packets across RRC boundaries using such pathways.

According to at least one embodiment, a first regional virtual traffic hub (RVTH) may be established, e.g., in response to one or more programmatic requests from a client, using a first regional resource collection of a provider network. Routing actions generated at a decision making layer of the first RVTH may be performed at an action implementation layer of the first RVTH. A second RVTH may similarly be established using a second regional resource collection of a provider network. In response to another programmatic request (e.g., a hub linkage request), a plurality of network pathways to be used to transmit network packets between the first RVTH and the second RVTH may be identified and/or configured in various embodiments. At least some of the pathways may include one or more intermediary devices, e.g., within RRCs other than the source and destination RRCs to which the first and second RVTHs belong. In at least one embodiment, a set of dynamic routing parameters for traffic between the RVTHs may be identified, e.g., based on one or more parameters or properties of a hub linkage request.

A first action may be performed at the action implementation layer of the first RVTH in some embodiments, resulting in a transmission of contents of a network packet to the action implementation layer of the second RVTH along a first pathway of the plurality of network pathways. The network packet may have been received from a first isolated network which is programmatically attached to the first RVTH, and the first pathway may be selected from the plurality of network pathways based at least in part on one or more dynamic routing parameters (e.g., parameters that depend on metrics collected from the different pathways and/or the source and destination isolated networks) in different embodiments. A second action may be executed at the action implementation layer of the second regional virtual traffic hub in some embodiments, resulting in a delivery of the contents of the network packet to a destination within a second isolated network which is programmatically attached to the second RVTH. In at least some embodiments, clients may indicate various types of preferences associated with their inter-region traffic, such as specific intermediary RRCs or intermediary devices through which the traffic has to be routed in accordance with relevant security-related regulations, or specific RRCs/countries/states through which the client does not want their traffic to be routed. As such, customers of the provider network may be able to transparently access, and communicate with, resources that are located in isolated networks in geographically distant regions using combinations of linked region-level virtual traffic hubs, with the network pathways used for the traffic being managed on the customer's behalf by the provider network. If and when inter-region traffic conditions change and/or failures are detected along some of the pathways, the routes used for packets flowing from one region to another may be automatically adjusted to continue to provide the desired levels of performance and meet clients security-related and other constraints/preferences.

In some embodiments, clients may first submit respective requests to establish individual ones of the RVTHs, programmatically attach isolated networks to individual ones of the RVTHs, and then submit hub linkage requests to enable cross-region traffic to flow. In at least one embodiment, the burden of establishing individual RVTHs may be left to the provider network operator. For example, in one such embodiment a client may simply submit a network linkage request to a packet processing service, indicating some number of isolated networks (INs) that are to be linked using one or more virtual traffic hubs. In response to such a network linkage request, in some embodiments one or more RVTHs (with the number of RVTHs depending on the number of different RRCs with which the INs are associated) may be automatically created at the PPS, and the metadata to indicate attachments between the INs and the RVTHs may also be generated automatically. Based on routing/forwarding information provided by the clients on whose behalf the RVTHs are set up, actions to be performed at the action implementation layer nodes of the VTHs may be generated and used to route packets from one isolated network to another, using cross-RRC pathways and/or intra-RRC pathways as needed. Clients may submit path preferences programmatically, such as network elements, devices or RRCs that have to be included or excluded from the paths used for inter-region or intra-region traffic in various embodiments, and such preferences may be taken into account when routes are dynamically selected for the traffic. In some embodiments, dynamic routing parameters used to select the paths along which packets are to be routed from one RRC to another may include, among others, latency metrics, bandwidth metrics, packet loss metrics, and/or flow count metrics associated with individual ones of the plurality of network pathways. In at least one embodiment, the respective billing cost associated with transmitting packets along various paths between the RRCs (which may in turn depend on the supported performance and/or other capabilities of the paths) may also be taken into account when selecting the path to be used for a given set of packets—e.g., clients may programmatically indicate budget constraints to be taken into account when transmitting traffic between RRCs. Clients may submit programmatic requests to view the pathways that are being used between RRCs, alternate pathways that are available for use, and so on in different embodiments. In at least some embodiments, clients may be able to view metrics (e.g., packet transmission rates, packet drop rates, etc.) for intra-region traffic separately from metrics for inter-region traffic. In effect, a global, easy-to-use fabric for interconnecting isolated networks regardless of physical location may be provided for provider network clients in various embodiments.

As one skilled in the art will appreciate in light of this disclosure, certain embodiments may be capable of achieving various advantages, including some or all of the following: (a) enabling flexible, potentially asymmetric patterns of network traffic between isolated networks to be managed cleanly using separate routing domains configured on top of shared multi-tenant packet processing infrastructure resources, (b) improving the overall responsiveness of applications that utilize virtual traffic hubs, e.g., by adding packet processing service resources to the VTHs as the application workload increases, even in scenarios in which the application components are in geographically distant locations, (c) enabling various regulatory requirements (such as the requirement to log network traffic originating at some set of resources, or terminating at some set of resources) to be satisfied with a minimum of effort, (d) reducing the probability of security lapses by using separate route tables and routing domains for different classes of network traffic, and/or (e) enhancing the user experience of system administrators and/or application owners by providing configuration information and metrics separately on intra-region and inter-region levels. Because of the multi-tenant nature of the packet processing service used for VTHs, the overall amount of computing and other resources needed to route traffic between various isolated networks may also be reduced in at least some embodiments.

Example System Environment with Virtual Traffic Hubs Utilizing Multiple Route Tables FIG. 1 illustrates an example system environment in which multiple route tables may be employed at scalable virtual hubs of a packet processing service to implement a variety of networking applications, according to at least some embodiments. As shown, system 100 comprises an instance 102 of a virtual traffic hub at a provider network, set up using the resources of a multi-layer packet processing service in the depicted embodiment. The VTH instance 102 may be used to enable connectivity among a plurality of isolated networks 140A-140D. The packet processing service may, for example, include an administrative or control plane 190, as well as a data plane comprising fast-path resources 110 and slow-path resources 114 in the depicted embodiment. The control plane may be responsible for configuring various VTH instances and associated routing/forwarding metadata 108 in the depicted embodiment, while the data plane resources may be used to generate and implement actions to route packets originating at (and directed to) the isolated networks 140.

Connectivity among a number of different types of isolated networks 140 may be provided using a VTH instance 102 in the depicted embodiment. For example, isolated network 140A may comprise a set of resources at a data center or premise external to the provider network's own data centers, which may be linked to the provider network using VPN (virtual private network) tunnels or connections that utilize portions of the public Internet in the depicted embodiment. Isolated network 140B may also comprise resources at premises outside the provider network, connected to the provide network via dedicated physical links (which may be referred to as "direct connect" links) in the depicted embodiment. Isolated network 140C and 140D may comprise respective isolated virtual networks (IVNs) set up using resources located at the provider network's data centers in the depicted example scenario. An isolated virtual network may comprise a collection of networked resources (including, for example, virtual machines) allocated to a given client of the provider network, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for virtual machines may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. Similar flexibility may also apply to configuration settings at VPN-connected isolated networks such as 140A, and/or at isolated networks 140B connected via dedicated links to the provider network in the depicted embodiment.

In at least some embodiments, a PPS client 195 may provide at least a portion of the routing/forwarding metadata 108 of the VTH instance which is used for generating the actions that are eventually used to route network packets among the isolated networks 140, e.g., using one or more programmatic interfaces 170 of the PPS control plane 190. In the depicted embodiment, the routing/forwarding metadata 108 may include entries of a plurality of route tables 109. A given isolated network 140 may be programmatically associated with a particular route table 109, e.g., using a first type of programmatic interface (an interface used for the "associate" verb or operation) in the depicted embodiment; such an associated route table 109 may be used for directing at least a subset of outbound packets from the isolated network. In another type of programmatic action, route table entries whose destinations are within a given isolated network 140 may be programmatically propagated/installed (e.g., using a different interface for propagation or installation of entries into particular tables) into one or more route tables, enabling traffic from other sources to be received at the isolated network. In at least some embodiments, entries with destinations within a particular isolated network such as 140C may be propagated to one or more route tables 109 that are associated with other isolated networks such as 140A or 140B, enabling, for example, traffic to flow along paths 155A and 155B from those other isolated networks to 140C. Similarly, one or more entries with destinations within isolated network 140D may be propagated to a route table associated with isolated network 140C, enabling traffic to flow from isolated network 140C to isolated network 140D. For traffic represented by 155D, entries with destinations within isolated network 140D may be propagated to a route table associated with isolated network 140B in the depicted embodiment. In general, any desired combination of unidirectional or bi-directional traffic between a given pair of isolated networks that is programmatically attached to VTH instance 102 may be enabled by using the appropriate combination of route table associations and route table entry propagations in various embodiments. A wide variety of network flow configurations may thereby be supported in different embodiments, as discussed below in further detail.

After the routing metadata 108 has been set up, network packets may be accepted at the fast-path resources 110 (e.g., comprising one or more action implementation nodes or AINs) of the VTH instance from various resources within the different isolated networks 140 in the depicted embodiment. When a packet is received at an AIN, that AIN may attempt to find (e.g., using a key based on various properties of the packet's "flow", including for example the combination of source and destination IP addresses and ports) a matching action in its action cache in various embodiments. If an action is not found in the cache, the slow path resources 114 (e.g., one or more decision master nodes of the VTH instance) may be consulted by the AIN. A DMN may look for a previously-generated action appropriate for the received packet in its own cache in some embodiments. If a pre-generated action is found, it may be provided to the AIN for caching and implementation. If no such action is found by the DMN, a new action may be generated, e.g., using one of the route tables 109 which is associated with the source isolated network from which the packet was received in the depicted embodiment. An executable version of the action (e.g., in byte code expressed using instructions of a register-based virtual machine optimized for implementing network processing operations) may be generated, optionally cached at the decisions layer, and provided to the AIN, where it may be implemented for the current packet (and cached and re-used for subsequent packets of the same flow) in various embodiments.

In various embodiments, a given flow for which an action is generated may be characterized (or distinguished from other flows) based on one or all of the following attributes or elements of packets received at the packet processing service (PPS): the network protocol used for sending the packet to the PPS, the source network address, the source port, the destination network address, the destination port, and/or an application identifier (e.g., an identifier of a specific virtual network interface set up for communications between an isolated network and the PPS). In some embodiments the direction in which the packets are transmitted (e.g., towards the PPS, or away from the PPS) may also be included as an identifying element for the flow. A number of different networking protocols may be supported in different embodiments—e.g., including the Internet Protocol (IP), the Transmission Control Protocol (TCP), the User Datagram Protocol (UDP), the Internet Control Message Protocol (ICMP), protocols that do not belong to or rely on the TCP/IP suite of protocols, and the like.

Cell-Based Packet Processing Service

Figure 2:
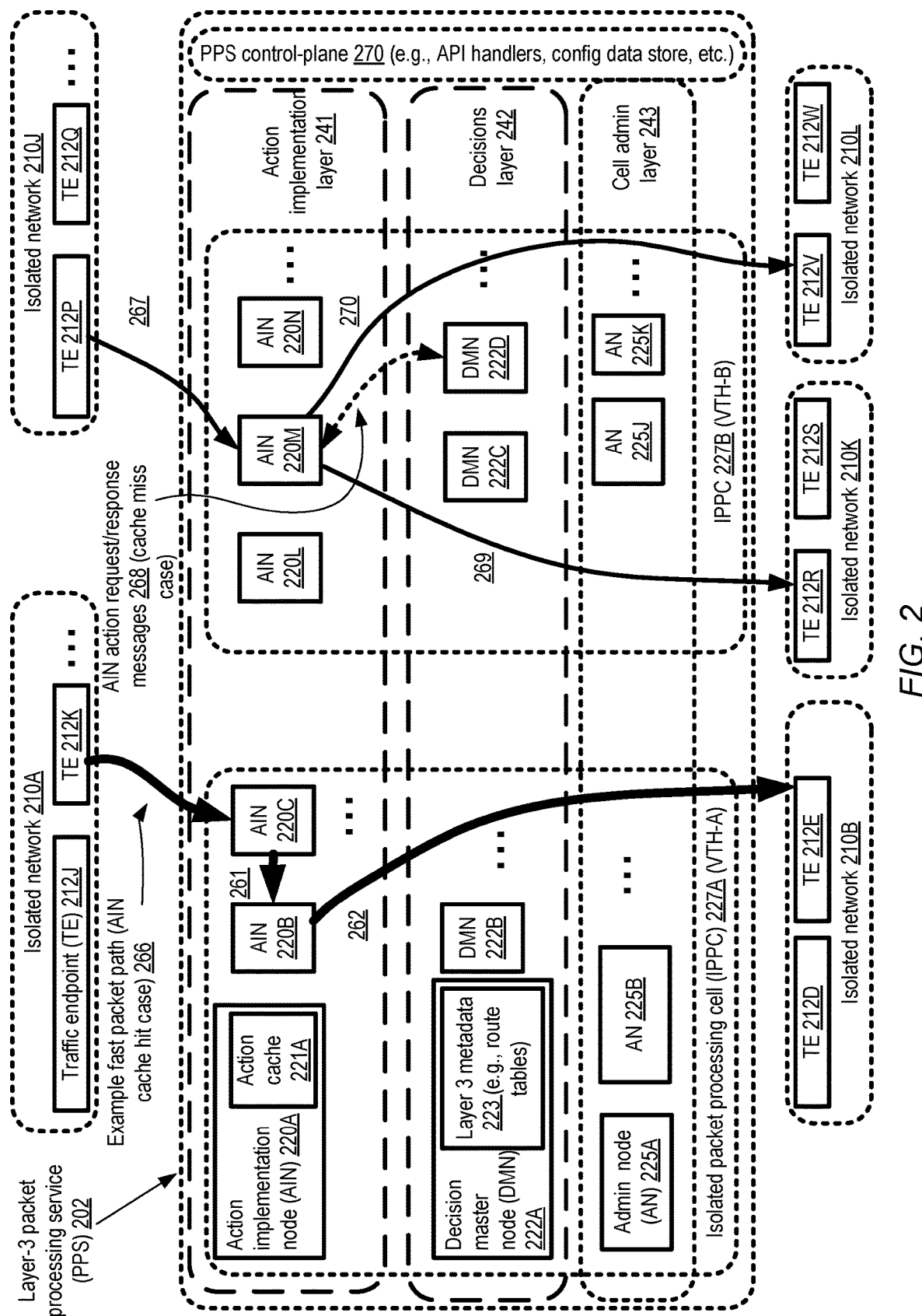
FIG. 2 illustrates an overview of a multi-layer cell-based packet processing service which may be used to establish virtual traffic hubs, according to at least some embodiments.

FIG. 2 illustrates an overview of a multi-layer cell-based packet processing service which may be used to establish virtual traffic hubs, according to at least some embodiments. As shown, a layer-3 packet processing service (PPS) 202 may comprise an action implementation layer 242, a decisions layer 242 and a cell administration layer 243, as well as a set of service-level control-plane resources 270 including API handlers, metadata stores/repositories and the like in the depicted embodiment. Individual ones of the layers 241, 242 and 243 may comprise a plurality of nodes, such as action implementation nodes (AINs) at layer 241, decision master nodes (DMNs) at layer 242, and administration nodes (ANs) at layer 243. Resources of layers 241, 242, and 243 may be organized into groups called isolated packet processing cells (IPPCs) 227 (e.g., 227A or 227B) in various embodiments, with a given IPPC 227 comprising some number of AINs, some number of DMNs, and some number of ANs. For example, IPPC 227A may include AINs 220A, 220B and 220C, DMNs 222A and 222B, and ANs 225A and 225B in the depicted embodiment, while IPPC 227B may comprise AINs 220L, 220M and 220N, DMNs 222C and 222D, and ANs 225J and 225K. Individual nodes such as AINs, DMNs and/or ANs may be implemented using some combination of software and hardware at one or more computing devices in different embodiments—e.g., in some embodiments, a given AIN, DMN or AN may comprise a virtual machine running at a host managed by a virtualized computing service of a provider network, while in other embodiments AINs, DMNs and/or ANs may be implemented using non-virtualized servers.

The resources of the packet processing service 202 may serve as an infrastructure or framework that can be used to build a variety of networking applications using virtual traffic hubs, such as applications for forwarding/routing packets between isolated networks, applications for multicasting packets, virtual private networking applications and the like in different embodiments. Individual IPPCs 227 may be assigned to implement the logic of one or more instances of such an application in some embodiments, with the traffic associated with that application being processed (at least under normal operating conditions) without crossing IPPC boundaries. For example, in the depicted embodiment, IPPC 227A may have been assigned to an instance of a VTH (VTH-A) for transmitting packets between at least isolated network 210A and isolated network 210B, while IPPC 227B may have been assigned to another VTH instance (VTH-B) for transmitting packets between at least isolated network 210J and 210K. Individual ones of the isolated networks 210 may have associated private IP address ranges, such that addresses assigned to resources within a given isolated network 210 may not be visible to resources outside the isolated network, and such that at least by default (e.g., prior to the assignment of an IPPC implementing a virtual routing application), a pathway between resources within different isolated networks may not necessarily be available.

In various embodiments, instances of networking applications, such as virtual traffic hubs VTH-A and VTH-B that perform routing between isolated networks 210, may be set up in response to programmatic requests received from customers of the PPS 202. Such requests may, for example, be received at API handlers of the PPS control-plane 270. In response to a client's request or requests to enable virtualized routing via a hub between isolated networks 210A and 210B, for example, VTH-A built using IPCC 227A may be assigned to forward packets among the two isolated networks in the depicted embodiment. Similarly, in response to another client's request (or the same client's request) to enable multicast connectivity among isolated networks 210J, 210K and 210L, IPPC 227B may be assigned. In at least some embodiments, a collection of virtual network interfaces may be programmatically configured to enable traffic to flow between endpoints (TEs 212, such as 212D, 212E, 212J, 212K, 212P, 212Q, 212R, 212S, 212V and 212W) in the isolated networks and the AINs of the cell assigned to those isolated networks. Clients on whose behalf the networking applications are being configured may provide decision metadata (e.g., layer 3 metadata 223 such as forwarding information base entries, route table entries and the like) and/or policies that can be used to determine the packet processing actions that are to be performed via control plane programmatic interfaces of the PPS in some embodiments. The metadata received from the clients may be propagated to the decision manager nodes of the appropriate IPPCs 227, e.g., from the PPS API handlers via the ANs 225 or directly in the depicted embodiment. In at least some embodiments, the metadata initially provided by the clients may be transformed, e.g., by converting high-level information into more specific route table entries that take into account the identifiers of virtual network interfaces to be used, locality-related information, information about the availability containers in which various AINs are configured, and so on, and the transformed versions may be stored at the different DMNs 222.

A given packet from a source endpoint such as TE 212K of isolated network 210A may be received at a particular AIN such as 220C in the depicted embodiment. The specific AIN to be used may be selected based, for example, on a shuffle-sharding algorithm in some embodiments, such that packets of a particular flow from a particular endpoint are directed to one of a subset of the AINs of the cell. Individual ones of the AINs may comprise or have access to a respective action cache, such as action cache 221A. An action cache may be indexed by a combination of attributes of the received packets, such as the combination of an identifier of the sending client, the source and destination IP addresses, the source and destination ports, and so on. Actions may be stored in executable form in the caches in some embodiments, e.g., using byte code expressed using instructions of a register-based virtual machine optimized for implementing network processing operations. AIN 220C may try to look up a representation of an action for the received packet in its cache. If such an action is found, the packet may be processed using a "fast path" 266 in the depicted embodiment. For example, an executable version of the action may be implemented at AIN 220C, resulting in the transmission of the contents of the packet on a path towards one or more destination endpoints, such as TE 212E in isolated network 210B. The path may include zero or more additional AINs— e.g., as shown using arrows 261 and 262, the contents of the packet may be transmitted via AIN 220B to TE 212E in the depicted fast packet path. AIN 220B may have a virtual network interface configured to access TE 212E, for example, while AIN 220C may not have such a virtual network interface configured, thus resulting in the transmission of the packet's contents via AIN 220B. Note that at least in some embodiments, one or more header values of the packet may be modified by the action (e.g., in scenarios in which overlapping private address ranges happen to be used at the source and destination isolated networks)—that is, the packet eventually received at the destination endpoint 212E may differ in one or more header values from the packet submitted from the source endpoint 212K.

If an AIN's local action cache does not contain an action for a received packet, a somewhat longer workflow may ensue. Thus, for example, if a packet is received from TE 212P at AIN 220M (as indicated via arrow 267), and a cache miss occurs in AIN 220M's local cache when a lookup is attempted for the received packet, AIN 220M may send an action query to a selected DMN (DMN 222D) in its IPCC 227B, as indicated by arrow 268. The DMN 222D may determine, e.g., based on a client-supplied policy indicating that a multicast operation is to be performed, and based on forwarding/routing metadata provided by the client, that the contents of the packet are to be transmitted to a pair of endpoints 212R and 212V in isolated networks 210K and 210L respectively in the depicted example. A representation of an action that accomplishes such a multicasting operation may be sent back to AIN 220M, stored in its local cache, and executed at AIN 220M, resulting in the transmissions illustrated by arrows 269 and 270. In this example, AIN 220M can send outbound packets directly to the destination TEs 212R and 1212V, and may not need to use a path that includes other AINs of IPCC 227B.

As the traffic associated with the applications flows via the IPCCs 227, their respective ANs may collect various types of metrics. Based at least partly on the metrics, as and when needed, additional AINs, DMNs (or even ANs) may be instantiated in various embodiments. At least in some embodiments, different IPCCs may have differing initial configurations—e.g., some IPCCs may start out with 10 AINs and 3 DMNs, others with 20 AINs and 7 DMNs, and so on. If the total workload being handled by the current set of IPCCs exceeds a threshold, new IPCCs may be instantiated and assigned to new application instances or VTHs (or, via application migration, to existing application instances or VTHs) in some embodiments. Similarly, if the overall workload falls below a threshold, or the resource utilization metrics of one or more IPCCs falls below some threshold, selected IPPCs (or individual nodes within selected IPPCs) may be decommissioned in various embodiments. Some application instances may potentially generate more traffic than can be handled by the maximum capacity that be provisioned by a given IPCC—in such scenarios, multiple IPCCs may be used in at least one embodiment for a given application instance.

A given IPPC 227 of the PPS 202 may be referred to in some embodiments as being "isolated" because, at least during normal operating conditions, no data plane network traffic may be expected to flow from that cell to any other cell of the service as indicated earlier. In at least one embodiment, control plane traffic may also not flow across cell boundaries under normal operating conditions. As a result of such isolation, a number of benefits may be obtained: e.g., (a) an increase in a workload of one instance of a packet processing application, being implemented using one cell, may have no impact on the resources being used for other applications at other cells, and (b) in the rare event that a failure occurs within a given cell, that failure may not be expected to have any impact on applications to which other cells have been assigned. Software updates may be applied to nodes of one cell at a time, so any bugs potentially introduced from such updates may not affect applications using other cells. The specific type of packet processing being performed may vary from one application to another, and as a result from one IPPC 227 to another in at least some embodiments. In some embodiments, while at least one IPPC may be assigned to a given VTH instance, a given IPPC 227 may potentially be employed in a multi-tenant mode for multiple VTHs configured on behalf of multiple customers. In at least some embodiments, nodes of the packet processing service cells may generate and run highly efficient executable actions to implement the application-specific packet processing logic based on customer-supplied policies, e.g., using a virtual machine instruction set optimized for networking-related operations.

In at least some embodiments, a shuffle sharding algorithm may be used to assign a subset of nodes (e.g., AINs) of an IPPC 227 to a given set of one or more source or destination endpoints of a given application. According to such an algorithm, if the IPPC comprises N AINs, packets from a given source endpoint E1 may be directed (e.g., based on hashing of packet header values) to one of a subset S1 of K AINs (K<N), and packets from another source endpoint E2 may be directed to another subset S2 of K AINs, where the maximum overlap among S1 and S2 is limited to L common AINs. Similar parameters may be used for connectivity for outbound packets to destination endpoints from the packet processing service in various embodiments. Such shuffle sharding techniques may combine the advantages of hashing based load balancing with higher availability for the traffic of individual ones of the source and destination endpoints in at least some embodiments.

Route Table Associations and Entry Propagations

Figure 3:
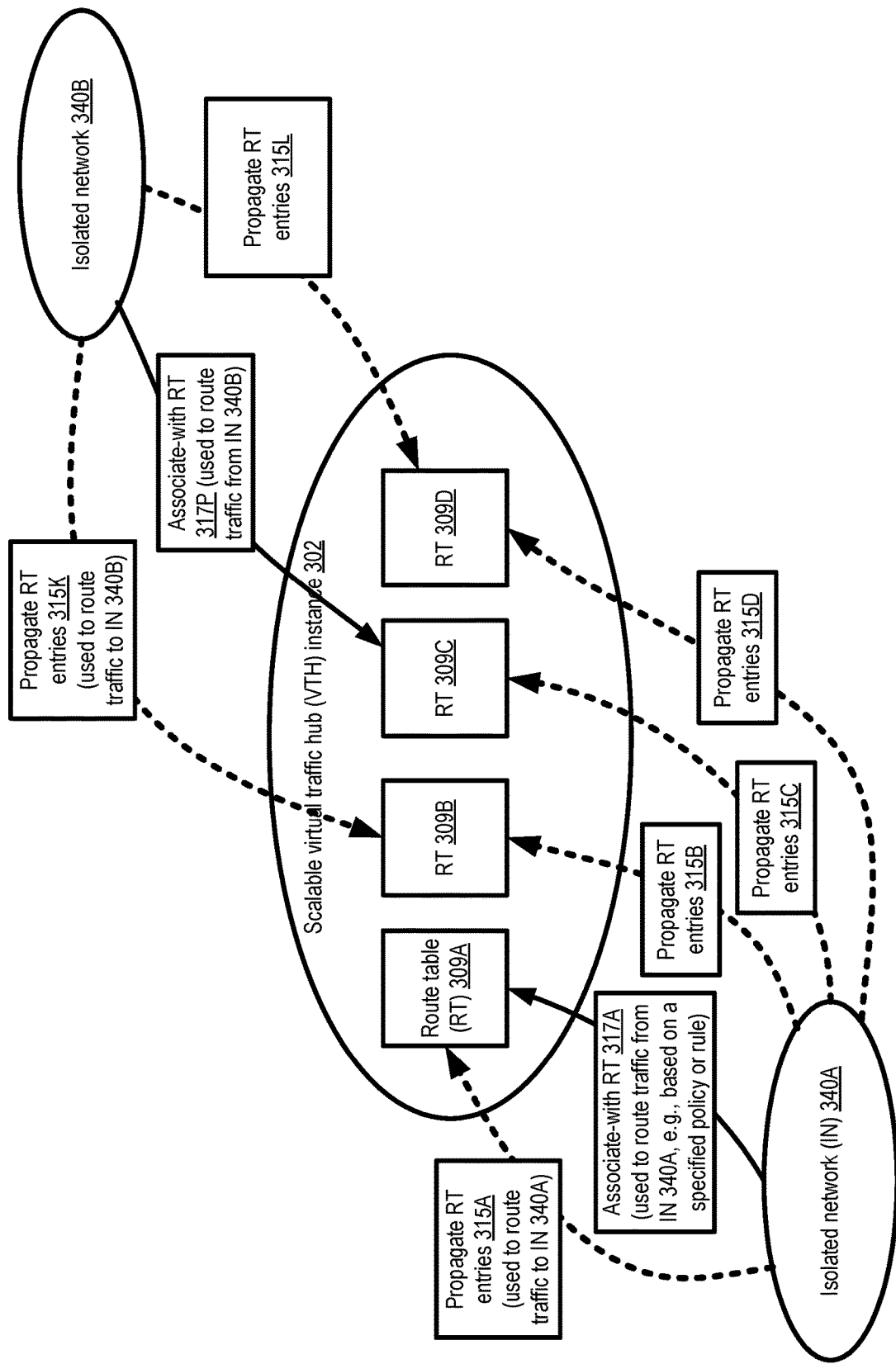
FIG. 3 illustrates an overview of two example categories of configuration operations at virtual traffic hubs: associations between route tables and isolated networks, and propagation of route table entries to route tables, according to at least some embodiments.

FIG. 3 illustrates an overview of two example categories of configuration operations at virtual traffic hubs: associations between route tables and isolated networks, and propagation of route table entries to route tables, according to at least some embodiments. As shown, the metadata used at a virtual traffic hub (VTH) instance 302 (similar in features and functionality to the VTH 102 of FIG. 1) to generate routing actions may include four route tables 309A-309D in the depicted embodiment. Two isolated networks (INs) 340A and 340B may be programmatically attached to the VTH instance 302. In at least some embodiments, a programmatic attachment request may be submitted by a client of the packet processing service to attach an isolated network to a VTH instance.

In order to generate the routing actions to be taken for outbound packets from a given isolated network 340, the decision layer nodes of the VTH 302 may have to be made aware of a route table (RT) whose entries contain source endpoints within than isolated network 340. Such a route table may be indicated via an "associate-with" interface in the depicted embodiment. Thus, for example, RT 309A may be associated with isolated network 340A via a request 317A (submitted after the IN 340A has been programmatically attached to the VTH 302), and metadata stored at the VTH indicating this association may be used to route outbound traffic using RT 309A in the depicted embodiment. Similarly, as indicated by the arrow representing request 317P, RT 309C may be programmatically associated with isolated network 340B, enabling entries stored within RT 309C to be used to generate actions for outbound network packets from isolated network 340B in the depicted embodiment. In some embodiments, a request to programmatically attach an isolated network with a VTH may include a request to associate the isolated network with a particular route table. In at least some embodiments, an association request such as 317A or 317P may include an indication of a rule or policy to be used to determine whether a particular set of packets are to be routed using that route table. Such a rule or policy may, for example, include a descriptor such as a 5-tuple (comprising source network address range, source network port range, destination network address range, destination network port range, and network protocol) that can be used to identify the particular packets which are to be routed using that route table. Thus, more than one route table may potentially be associated with a particular isolated network such as 340A or 340B, to be used for respective subsets of outbound packets in some embodiments. Using such conditional or filtered association operations, application-specific routing may be supported in at least some embodiments—e.g., outbound database-related traffic originating at an isolated network 340 may be routed using one associated route table, outbound web-server related traffic originating at the isolated network 340 may be routed using a second routing table, and so on. In some embodiments, unconditional association requests (which do not specify policies or rules indicating the subset of packets to be routed using the specified table) as well as conditional association requests may be supported by a packet processing service. In other embodiments, only unconditional or only conditional associations may be supported.

In contrast to the associate-with requests 317A and 317P, which indicate which route table should be used for routing outbound packets from a given isolated network, a different type of programmatic request may be used to propagate specific entries for routing inbound traffic to a given isolated network in the depicted embodiment. Thus, for example, using respective "propagate-RT-entries" requests 315A, 315B, 315C and 315D (which may also be submitted after the IN 340A has been programmatically attached to the VTH 302), one or more route table entries whose destinations lie within isolated network 340A may be included within RTs 309A, 309B, 309C and 309D in the depicted embodiment. Note that individual ones of the RTs 309A-309D may at least potentially be associated with (and therefore used for outbound traffic from) various other isolated networks, not all of which are shown in FIG. 3. Thus, by selecting which specific RTs should include entries with destinations in IN 340A, the administrator of IN 340A (or some other entity responsible for propagations 315A-315D) may be able to control exactly which sets of sources can send packets to IN 340A in the depicted embodiment. One or more RT entries with destinations within isolated network 340B may similarly be propagated to RTs 309B and 309D in the depicted embodiment, enabling fine-grained control over which sources are allowed to direct traffic to isolated network 340B.

In at least some embodiments, a given isolated network 340 may have to be associated with one and only one RT 309 to enable outbound traffic to be transmitted from that isolated network; thus, the IN-to-RT-associations may be 1:1 relationships in such embodiments. In other embodiments in which, for example, conditional associations of the kind discussed above are supported, multiple route tables may be associated with a given IN for respective subsets of outbound traffic. In various embodiments, for a given packet, one or more VTH nodes may unambiguously determine the particular route table which is to be used to route a given packet from a given isolated network, regardless of whether conditional, unconditional, or both conditional and unconditional associations are supported. In at least some embodiments, route table entries for incoming traffic of a given IN may be propagated to any number of RTs, including for example an RT with which the given IN is also associated. Thus, the IN-to-RT-entry-propagations may be a 1:N relationship, where N>=1, in the depicted embodiment. Note that in some embodiments, several of the operations of (a) programmatically attaching an IN to a VTH, (b) programmatically associating an IN to an RT of the VTH and/or (c) programmatically propagating entries for destinations within an IN to an RT may be performed using a single programmatic request—that is, the three operations need not necessarily require respective types of requests.

Single Shared RT Scenario

Figure 4:
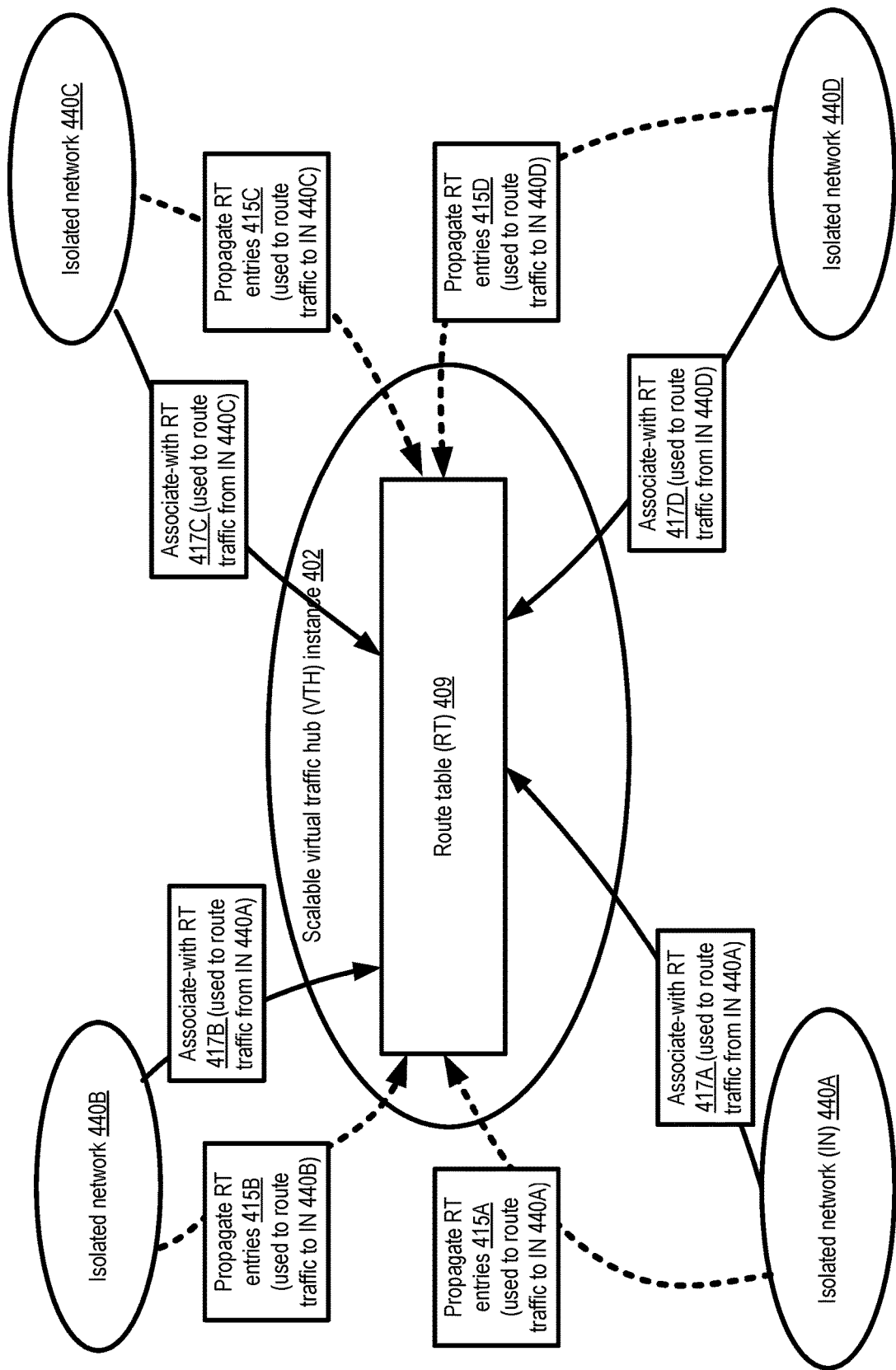
FIG. 4 illustrates an example use of a single shared route table to manage connectivity, via a virtual traffic hub, between multiple isolated networks, according to at least some embodiments.

Although multiple route tables may be included in a VTH's metadata to manage the desired traffic patterns of some applications, a single route table may be used for both outbound and inbound traffic of several different isolated networks in at least one embodiment. FIG. 4 illustrates an example use of a single shared route table to manage connectivity, via a virtual traffic hub, between multiple isolated networks, according to at least some embodiments.

A route table 409 of the virtual traffic hub 402 (similar in features and capabilities to VTH 102 of FIG. 1) has been associated with four isolated virtual networks 440A-440D in the depicted example scenario, e.g., via four separate programmatic associate-with requests 417A-417D. As a result of the associate-with requests, route table 409 may be consulted by decision layer nodes of VTH 402 to generate actions for routing outbound packets from each of the four isolated networks. Furthermore, as a result of propagate-RT-entries requests 415A-415D, entries with destinations within each of the four isolated networks may also be propagated to the common RT 409. Thus, the flow of both directions of traffic for each of the four isolated networks may be managed using a single route table of the VTH 402 in the depicted embodiment.

Routing Packets Among Disjoint Sub-Groups of Isolated Networks

Figure 5:
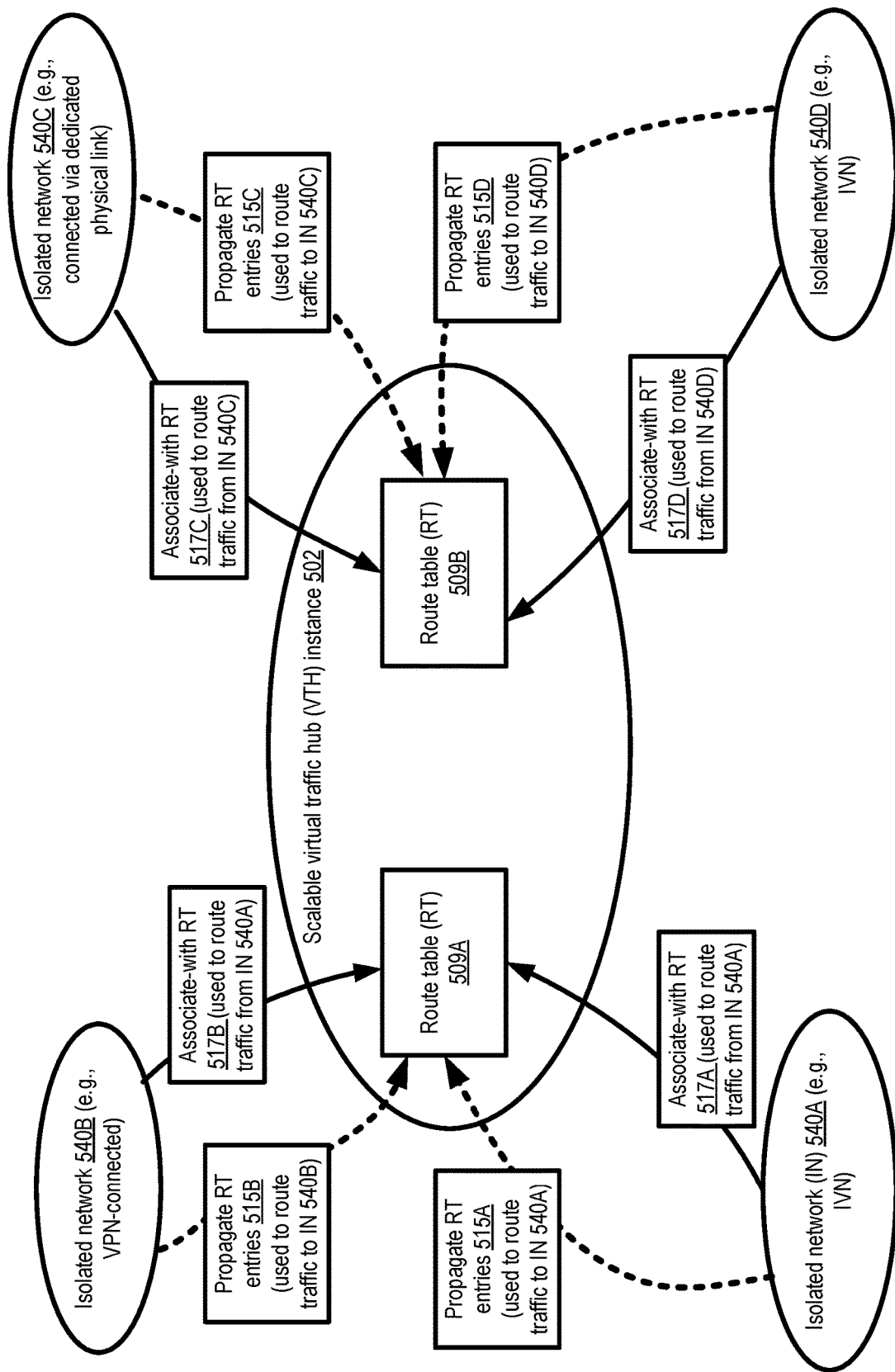
FIG. 5 illustrates an example use of respective route tables of a virtual traffic hub to restrict connectivity to within disjoint sub-groups of isolated networks, according to at least some embodiments

FIG. 5 illustrates an example use of respective route tables of a virtual traffic hub to restrict connectivity to within disjoint sub-groups of isolated networks, according to at least some embodiments. In the depicted example scenario, route tables 509A and 509B may be set up at a virtual traffic hub (VTH) instance 502 (similar to VTH instance 102 of FIG. 1) on behalf of a client of a packet processing service, corresponding to respective routing domains. Isolated networks 540B and 540A may both be associated with route table 509A, e.g., as a result of respective programmatic associate requests 517A and 517B. Isolated network 540A may, for example, be an IVN set up within a provider network's data centers on behalf of the client, while isolated network 540B may comprise resources at a premise outside the provider network and linked to the provider network via VPN tunnel(s). Because of the associations of isolated networks 540A and 540B with route table 509A, outbound traffic from both networks may be routed using route table 509A. To enable inbound traffic to flow towards isolated network 540A, route table entries with destinations within network 540A may be propagated to route table 509A in the depicted embodiment, e.g., in response to one or more other programmatic requests 515A; similarly, route tables with destinations within network 540B may also be propagated to route table 509A in response to programmatic interaction 515B. As a result, traffic in both inbound and outbound directions with respect to networks 540A and 540B may be routed using route table 540A.

Two other isolated networks, 540C and 540D, may be associated programmatically with the second route table 509B of VTH 502 in the depicted example scenario, e.g., as result of programmatic requests 517C and 517D. Isolated network 540C may, for example, comprise a set of resources at an external premise, which are connected to the provider network via a dedicated physical link of the kind discussed earlier, while isolated network 540D may comprise an IVN of the provider network. For inbound traffic, route table entries with destinations within 540C and 540D may be propagated to route table 509B, e.g., in response to programmatic propagation requests 515C and 515D. Traffic in inbound and outbound directions with respect to isolated networks 540C and 540D may thus be routed using table 509B alone.

In the example scenario of FIG. 5, the combination of programmatic associations and route table entry propagations may in effect ensure that traffic of respective subgroups of isolated networks (e.g., one subgroup comprising 540A and 540B, and another subgroup comprising 540C and 540D) flows only within those sub-groups, and does not cross sub-group boundaries. As the amount of traffic to/from individual ones of the isolated networks increases or decreases, the number of nodes of the VTH instance 502 (e.g., at the action implementation layer, and/or at the decisions layer) may be increased or decreased correspondingly to ensure that the traffic continues to flow with desired levels of performance in the depicted embodiment. Such an approach may enable a client of a provider network to use a single VTH instance to set up an arbitrary number "silos" of interconnected isolated networks as desired. Note that a given sub-group or silo may include any desired number of isolated networks; the two-member sub-groups shown in FIG. 5 are not intended to be restrictive. In various embodiments, a client may be able to programmatically modify the associations and route table entry propagations, thereby changing the connectivity between various isolated networks over time if needed. For example, if the client on whose behalf the configuration shown in FIG. 5 is set up wishes to enable traffic to flow across the sub-groups, route tables entries from one sub-group may be propagated to both route tables, and/or a new combined route table may be set up.

Consolidating Edge Traffic Using a Virtual Traffic Hub

Figure 6:
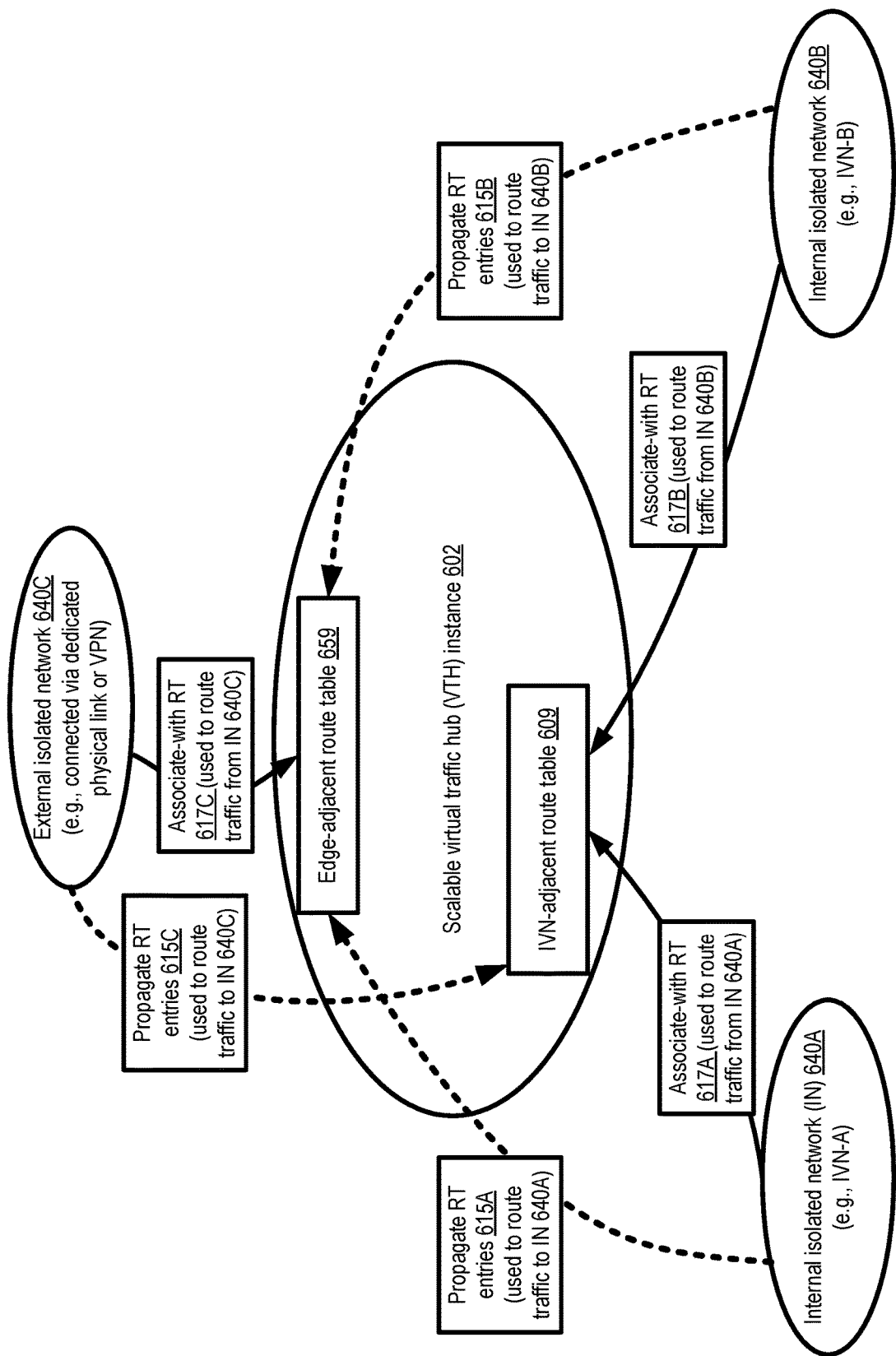
FIG. 6 illustrates an example use of respective route tables of a virtual traffic hub of a provider network to manage inbound and outbound traffic of an isolated network external to a provider network's data centers, according to at least some embodiments.

FIG. 6 illustrates an example use of respective route tables of a virtual traffic hub of a provider network to manage inbound and outbound traffic of an isolated network external to a provider network's data centers, according to at least some embodiments. In the example scenario depicted in FIG. 6, several isolated virtual networks (IVNs) may have been set up within a provider network on behalf of a client, such as internal isolated network 640A (IVN-A) and internal isolated network 640B (IVN-B). The client may also have an external isolated network 640C (which may also be referred to as an edge-connected network or an edge network), comprising some set of resources located at a client data center or some other location outside the provider network in the depicted embodiment. External isolated networks may for example be connected to the provider network via VPN or using dedicated physical links in various embodiments. It may be the case that, based on the requirements of the client, (a) traffic is to be permitted to flow between individual ones of the internal isolated networks and the external isolated network, and (b) traffic is not to be permitted to flow between the internal isolated networks. Thus, network packets are to be permitted to flow in either direction between individual isolated networks of the pair (640A, 640C) and between individual isolated networks of the pair (640B, 640C), but not between the pair (640A, 640B).

In order to achieve these objectives, a single VTH instance 602 (similar in functionality to VTH 102 of FIG. 1) may be established on behalf of the client in the depicted embodiment. Two route tables, an edge-adjacent route table 659, and an IVN-adjacent route table 609, may be set up at the VTH. The external isolated network 640C may be programmatically associated with the edge-adjacent route table 659 (e.g., based on request 617C), while the internal route table 659 may be programmatically associated with the IVN-adjacent route table 609 (e.g., based on requests 617A and 617B). Further, route table entries for destinations within internal isolated networks 640A and 640B may be propagated to the edge-adjacent route table 659 (e.g., based on request 615A and 615B). Route table entries for destinations within external isolated network 640C may be propagated to the IVN-adjacent route table 609 (e.g., based on request 615C).

In the example scenario depicted in FIG. 6, packets originating at the external isolated network 640C may be routed via the VTH 602, e.g., based on actions generated using route table 659, to destinations within the internal isolated networks 640A or 640B. Packets originating at the internal isolated networks 640A or 640B may be routed to the external isolated network via the VTH 602, based on actions generated using route table 609. Because no route table entries with destinations within the internal isolated networks 640A or 640B are propagated to the IVN-adjacent route table 609 used for outbound traffic from the internal isolated networks, packets may not flow via the VTH 602 between the internal isolated networks. The use of VTHs with multiple route tables may enable various types of asymmetric connectivity configurations between groups of isolated networks to be set up in different embodiments; the asymmetrical configuration shown in FIG. 6 is not intended to be limiting.

Routing Traffic Via Security Intermediaries Using VTHs

Figure 7:
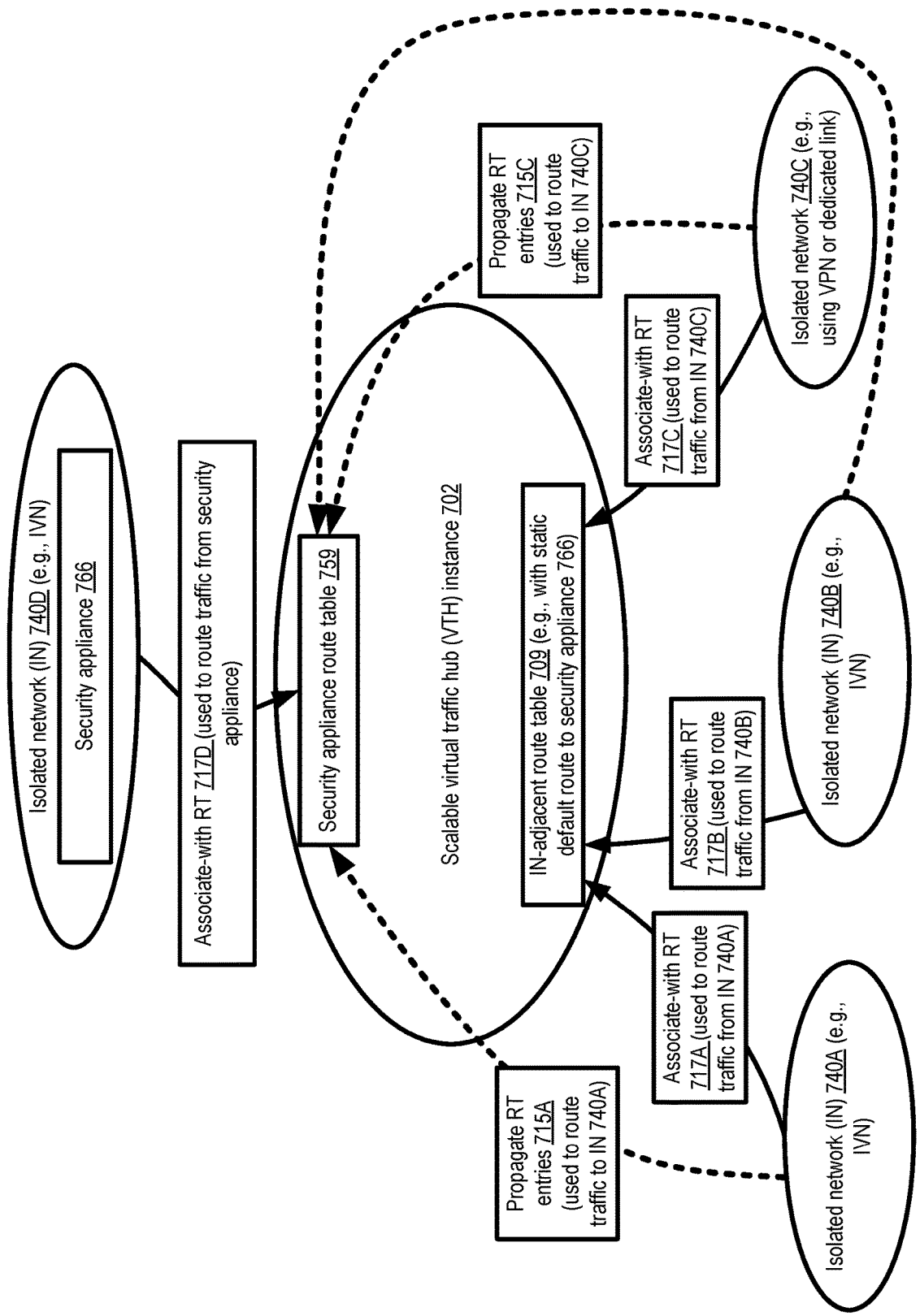
FIG. 7 illustrates an example use of a set of route tables of a virtual traffic hub to manage security-related requirements associated with traffic flowing between isolated networks, according to at least some embodiments.

FIG. 7 illustrates an example use of a set of route tables of a virtual traffic hub to manage security-related requirements associated with traffic flowing between isolated networks, according to at least some embodiments. In the example scenario shown in FIG. 7, a client of a packet processing service may have three isolated networks 740A, 740B and 740C configured. The client may wish to enable connectivity in both directions between resources in any of the three isolated networks in the depicted embodiment, with at least one security-related condition: that all the packets flowing between any given pair of the three isolated networks have to be processed at a security appliance 766. The security appliance 766 may, for example, comprise a processing engine or program that performs any combination of one or more security-related tasks, such as logging the transmission of the packets in one or more directions between pairs of isolated networks (e.g., storing log records corresponding to at least some subset of transmitted packets), ensuring that the contents of the packets do not violate regulations, requirements or policies of the client for inter-isolated-network traffic, and so on. In the depicted embodiment, the security appliance 766 may be part of a fourth isolated network 740D, e.g., another IVN established at the VCS on behalf of the client. In other embodiments, the security appliance may not necessarily be part of a separate isolated network.

In order to achieve the client's objectives, a VTH instance 702 with at least two route tables may be configured in the depicted embodiment: an IN-adjacent route table 709, and a security appliance route table 759. The IN-adjacent route table 709 may be programmatically associated with each of the isolated networks 740A-740C, e.g., in response to requests 717A, 717B and 717C. As a result, outbound traffic from the three isolated networks may be routed using actions generated at the VTH based on contents of table 709. In at least one embodiment, a static default route which directs all packets to the security appliance 766 may be stored within table 709. In other embodiments, a route to the security appliance may be propagated to table 709, e.g., in response to a programmatic request not shown in FIG. 7. As a result of storing such entries, any packet that reaches VTH instance 702 may be forwarded to security appliance 766 in at least some embodiments.

Entries with destinations within isolated networks 740A-740C may be propagated to and stored in security appliance route table 759, e.g., in response to programmatic requests 715A-715C in the depicted embodiment. After one or more security-related operations are performed on a given packet at the appliance 766, the packet may be sent to the VTH 702, from where it may be transmitted to one of the isolated networks 740A-740C. The security related requirements of the client may thereby be satisfied using the VTH 702 in the depicted embodiment. In some embodiments, multiple security appliances 766 may be used, e.g., to prevent a single appliance from becoming a bottleneck. In at least one embodiment, a security intermediary such as appliance 766 may be configured (e.g., based on one or more programmatic requests from a client) as a filter, such that at least some received packets are dropped/discarded instead of being forwarded towards a destination. A wide variety of filtering criteria, indicating for example that packets whose source/destination addresses or ports lie outside a particular client-selected range are to be dropped, or that packets whose sizes/contents do not meet client-specified conditions are to be dropped, may be enforced with the help of security intermediaries similar to appliance 766 to which traffic is directed using route tables of a VTH in various embodiments, Note that while in the example shown in FIG. 7, the intermediary security appliance is used symmetrically for traffic in either direction among pairs of the other isolated networks (e.g., for traffic from 740A to 740B, 740A to 740C, 740B to 740C, 740B to 740A, 740C to 740A, or 740C to 740B), route tables of a VTH may be set up to support the asymmetrical use of intermediaries in various embodiments. For example, in one embodiment, only packets originating at isolated network 740A may be required to be transmitted via an intermediary appliance, while packets may be permitted to flow between the isolated networks 740B and 740C without passing through an intermediary appliance. In addition, aspects of several of the configuration approaches discussed in the context of FIG. 3, FIG. 4, FIG. 5, FIG. 6 and/or FIG. 7 may be combined in various embodiments: e.g., route tables of a single VTH may be used to enable communication via an intermediary security appliance between one sub-group of isolated networks (as in FIG. 7), without an intermediary security appliance between segregated sub-groups or silos of isolated networks (as in FIG. 5), using an edge-adjacent route table shared for outbound traffic from several isolated networks of the provider network (as in FIG. 6), and so on. In at least some embodiments, a large number of isolated networks may be attached programmatically to a single VTH on behalf of a client, with the appropriate number of route tables being used to route traffic according to the client's requirements or objectives.

VTH Cells Distributed Across Availability Containers

Figure 8:
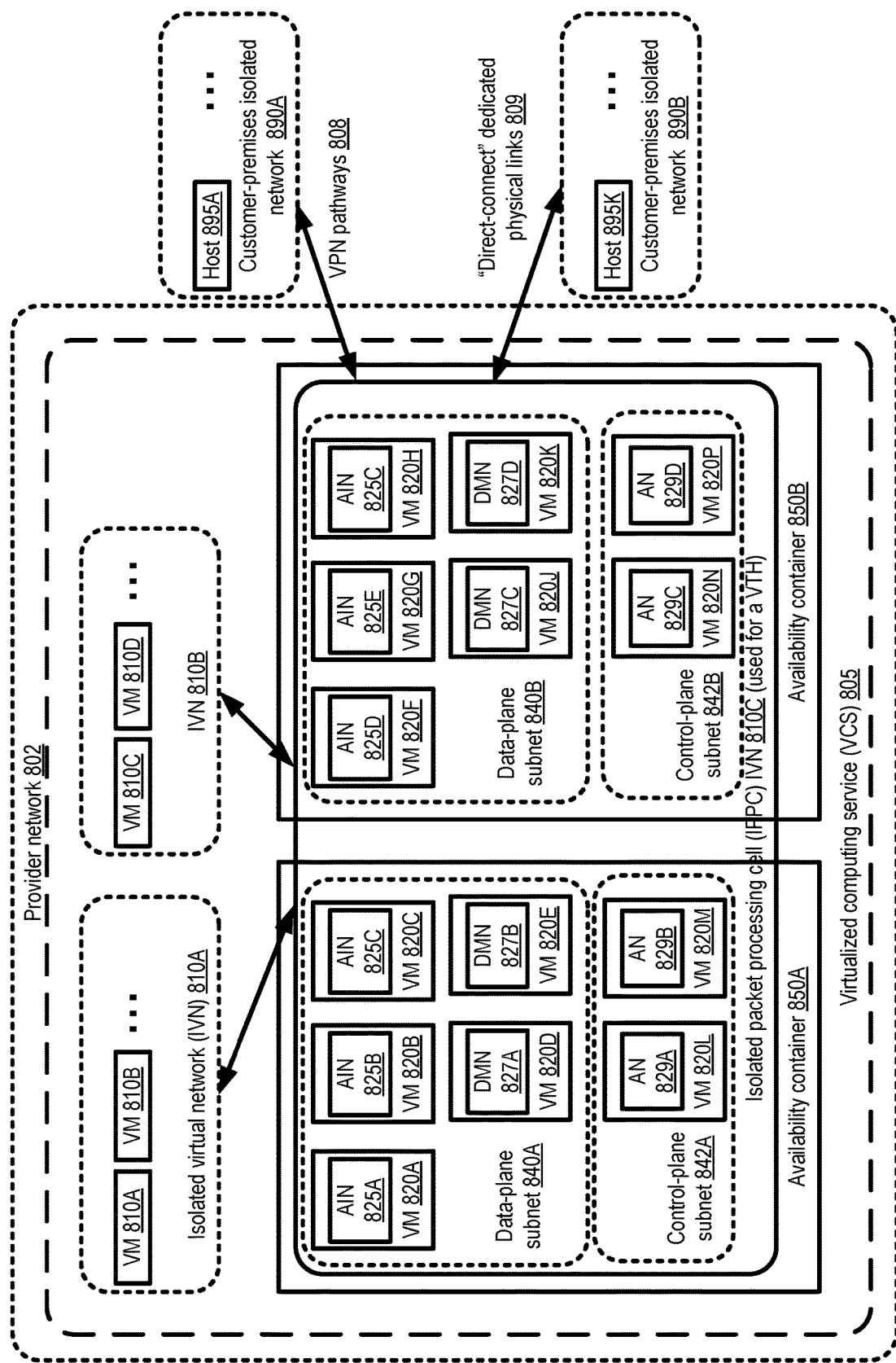
FIG. 8 illustrates an example scenario in which an isolated packet processing cell used for a virtual traffic hub may comprise nodes distributed among multiple availability containers of a virtualized computing service, according to at least some embodiments.

FIG. 8 illustrates an example scenario in which an isolated packet processing cell used for a virtual traffic hub may comprise nodes distributed among multiple availability containers of a virtualized computing service, according to at least some embodiments. In the depicted embodiment, a provider network 802 may comprise a virtualized computing service (VCS) 805 at which isolated virtual networks may be established on behalf of various customers or clients. As mentioned earlier, an isolated virtual network or IVN may comprise a collection of networked resources allocated to one client/customer of the VCS in some embodiments. In the embodiment depicted in FIG. 8, IVNs 810A and 810B, may be established for one or more VCS customers, while IVN 810C may be configured to implement an isolated packet processing cell used for a VTH of a packet processing service. IVN resources (including, for example, virtual machines), may be logically isolated from (and by default, inaccessible from) resources allocated for other clients in other isolated virtual networks in at least some embodiments. In the depicted embodiment, the packet processing service itself may be considered a client or customer of the VCS 805—that is, the packet processing service may be built by leveraging the functionality supported by the VCS 805. As mentioned earlier, the client on whose behalf an IVN is established may be granted substantial flexibility regarding network configuration for the resources of the IVN—e.g., private IP addresses for virtual machines may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on.

In at least some embodiments, the resources of the VCS 805, such as the hosts on which various virtual machines are run, may be distributed among a plurality of availability containers 850, such as 850A and 850B. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container.

In the depicted embodiment, action implementation nodes (AINs) 825, decision master nodes (DMNs) 827, and administration nodes (ANs) 829 (similar in capabilities to those shown in FIG. 2) may all be implemented at least in part using respective virtual machines (VMs) 820 of the VCS 805. As shown, AINs 825A, 825B, 825C, 825D, 825E and 825F may be implemented at virtual machines 820A, 820B, 820C, 820F, 820G and 820H respectively. DMNs 827A, 827B, 827C and 827D may be implemented at virtual machines 820D, 820E, 820J and 820K respectively, and ANs 829A, 829B, 829C and 829D may be implemented at VMs 820L, 820M, 820N and 820P respectively. In some embodiments, a given VM 820 may be instantiated at a respective physical virtualization host; in other embodiments, multiple VMs may be set up at a given physical host. The illustrated cell, implemented in IVN 810C, may comprise at least two data-plane subnets 840A and 840B, and at least two control-plane subnets 842A and 842B. One data plane subnet and one control plane subnet may be implemented in each of at least two availability containers 850—e.g., subnets 840A and 842A may be configured in availability container 850A, while subnets 840B and 842B may be configured in availability container 850B. A control-plane subnet 842 may comprise one or more ANs 829 at respective VMs 820 in some embodiments, while a data-plane subnet 840 may comprise one or more AINs 825 and one or more DMNs 827 at respective VMs 820. As a result of the use of multiple availability containers, the probability that the entire IPPC (or any given VTH which uses the nodes of the IPPC) is affected by any given failure event may be minimized in the depicted embodiment. The use of different subnets for control-plane versus data-plane nodes may help to separate at least the majority of the control plane traffic of the VTHs using the IPPC from the data plane traffic of the VTHs in various embodiments.

As shown, the IPPC implemented using IVN 810C may be used for packet processing applications involving traffic between at least four isolated networks—IVNs 810A and 810B, and customer-premises isolated networks 890A and 890B in the depicted embodiment. IVNs 810A and 810B may each comprise, for example, a set of virtual machines 810 (e.g., 810A, 810B, 810C or 810D) set up on behalf of a VCS customer. Isolated network 890A, which may for example be set up at a customer premise or location outside the provider network's own data centers and may include some number of hosts such as host 895A, may communicate with the IPPC via a set of virtual private network (VPN) pathways 808 in the depicted embodiment. Isolated network 890B may also be set up at a set of customer premises or locations outside the provider network 802 and may comprise some number of hosts such as host 895K in the depicted embodiment. Traffic between the isolated network 890B and the IPPC may flow over a set of dedicated physical links 809 in the depicted embodiment (e.g., instead of a set of links that may be shared with traffic of the public Internet), which may also be referred to as "direct-connect" links. As such, the packet processing service implemented using the VCS 805 of provider network 802 may be capable of processing packets generated at (or directed towards) a variety of network configurations in the depicted embodiment, including (but not necessarily limited to) isolated virtual networks within the VCS itself, external networks such as 890A which use VPN connections over shared links to communicate with the VCS, and external networks such as 890B which use dedicated links to communicate with the VCS. Other types of networks may also be connected using the packet processing service in various embodiments. In at least some embodiments, the nodes of the IPPCs may not utilize the type of multi-availability-container architecture shown in FIG. 8, may use non-virtualized hosts instead of or in addition to virtual machines, and/or may not necessarily use a virtualized computing service or other services of a provider network.

Customer Perspective Vs. Underlying Implementation

Figure 9:
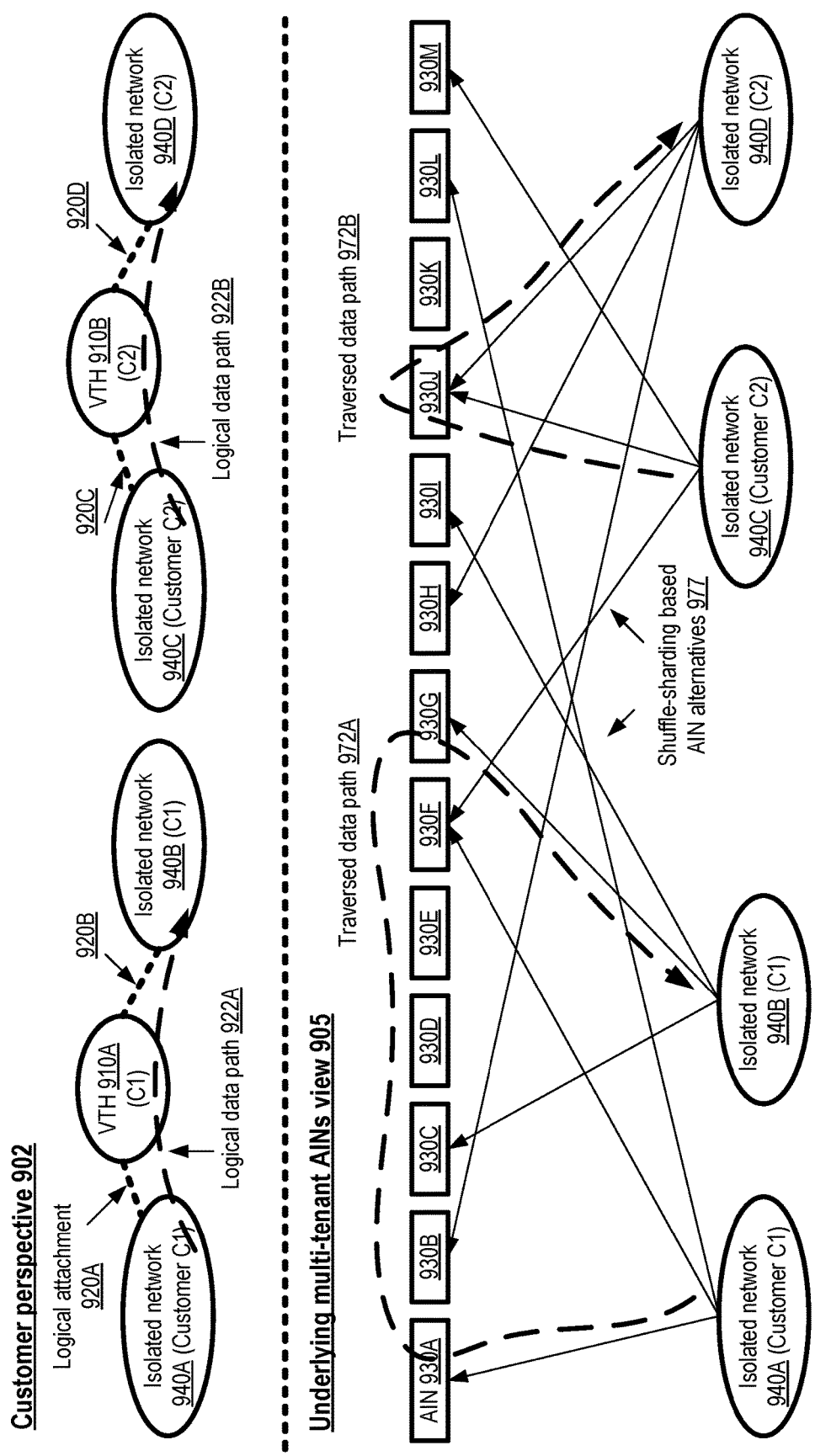
FIG. 9 illustrates examples of packet data paths between isolated networks connected via a virtual traffic hub, as viewed from a customer perspective and as implemented using a packet processing service, according to at least some embodiments.

FIG. 9 illustrates examples of packet data paths between isolated networks connected via a virtual traffic hub, as viewed from a customer perspective and as implemented using a packet processing service, according to at least some embodiments. VTH instances 910A and 910B, similar in functionality to VTH 102 of FIG. 1, may be set up on behalf of respective customers or clients C1 and C2 of a packet processing service in the depicted example scenario. From the perspective 902 of the customers, one programmatic request may, for example, be submitted to create a VTH instance. Other programmatic requests may be used to programmatically attach an isolated network 940 (e.g., 940A, 940B, 940C or 940D) to a specified VTH, create routing domains with associated route tables, associate route tables with isolated networks, propagate entries to the route tables, and so on. After a VTH instance 910 has been created, the isolated virtual networks' logical attachments 920 (e.g., 920A, 920B, 920C or 920D) to the VTHs have been performed, and route table associations/propagations have been set up from the customer perspective, traffic may begin to flow among the isolated networks 940 via the VTH, e.g., along logical data paths 922A or 922B. A customer may not necessarily be made aware of the details of exactly how many nodes are being used at the VTH instance, the paths along which packets are transmitted among nodes of the packet processing service, and so on in some embodiments. In other embodiments, at least some of the details may be provided to the customers, e.g., in response to programmatic requests.

Within the packet processing service, as indicated in the underlying multi-tenant AINs view 905, a plurality of AINs 930 (e.g., action implementation nodes 930A-930M belonging to a given isolated packet processing cell of the kind discussed earlier) may be assigned for each of the two CTH instances 910A and 910B. A shuffle-sharding algorithm may be used to identify, for a given flow, a subset of AINs 930 to be used for packets of a given flow originating at a given isolated network 940. Thus, for example, for a given flow of packets transmitted from isolated network 940A to isolated network 940B, any of three AINs 930A, 930F and 930L may be used to process inbound packets, while AINs 930C, 930I or 930G may be available for transmitting outbound packets. Similarly, for another flow associated with customer C2's isolated networks, AINs 930B 930J and 930M may be usable for inbound packets from isolated network 940C as per shuffle-sharding alternatives 977, and AINs 930B, 930H and 930J may be usable for outbound packets to isolated network 940D. A given packet of a flow from a source resource or endpoint of isolated network 940A may, for example, be processed at AIN 930A, and, as a result of an action implemented at AIN 930A, a corresponding forwarded packet may be sent from AIN 930A along path 972A to AIN 930G and from AIN 930G to a destination resource at isolated network 940B in the depicted embodiment. In some cases, as in the case of traversed data path 972B, the AIN (e.g., 930) that receives an inbound packet of a flow may be able to directly transmit the corresponding outbound packet to the destination isolated network (940D in the example associated with path 972B), instead of using another intermediary AIN in various embodiments. As indicated in FIG. 9, at least some AINs may be configured in a multi-tenant mode, for use on behalf of different customers' VTHs—e.g., AIN 930F may be used for packets associated with isolated network 940A of customer C1, and for packets associated with isolated network 940C of customer C2. In some embodiments in which a cell comprising a plurality of AINs 930 (or a plurality of DMNs) is assigned to more than one VTH instance, any of the AINs (or DMNs) of the cell may be used for any of the VTHs, depending for example on the shuffle sharding or other workload distribution algorithms being used.

Example Programmatic Interactions for VTHs with Multiple Route Tables

Figure 10:
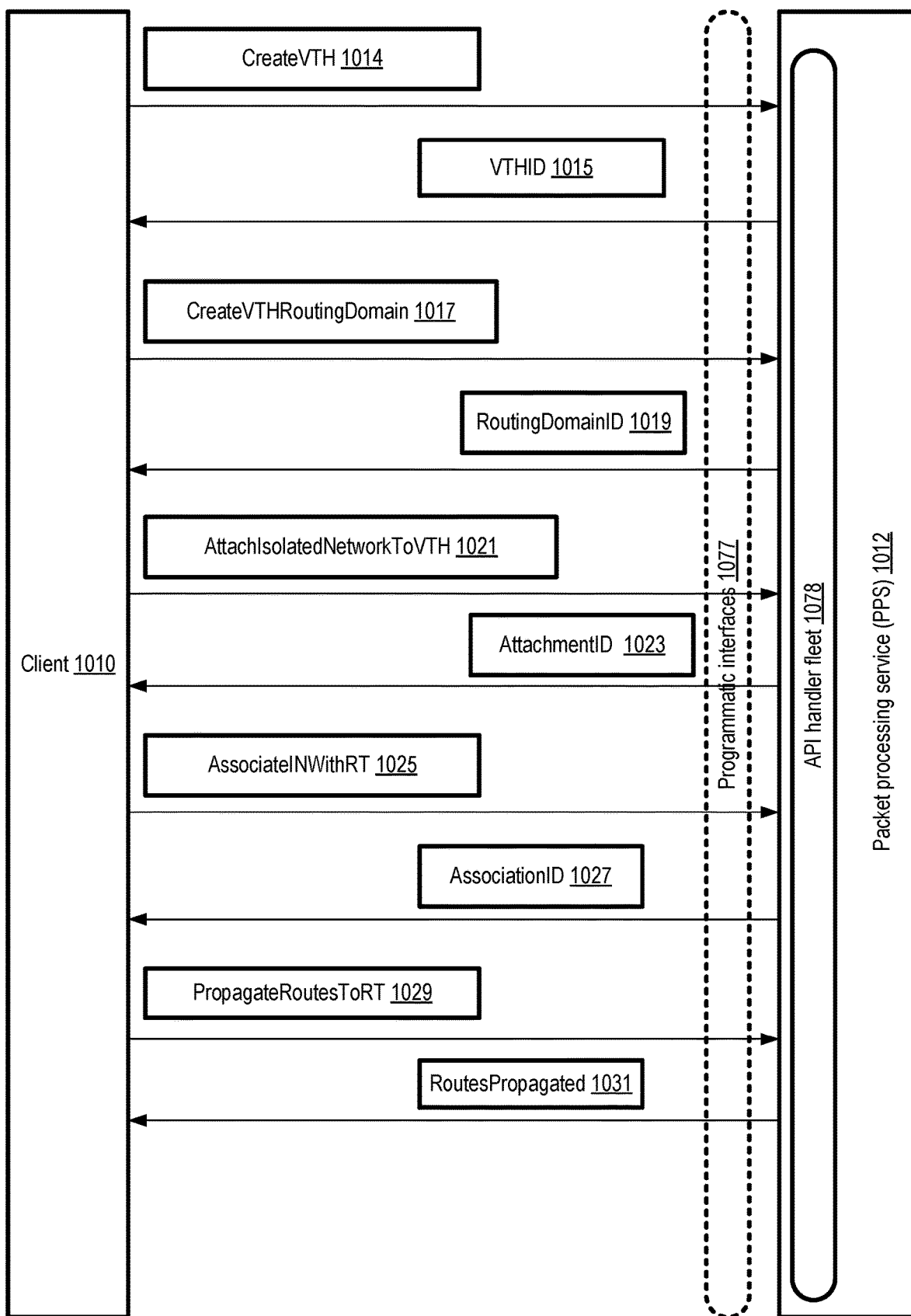
FIG. 10 illustrates example programmatic interactions between clients and a packet processing service at which multiple route tables may be used to manage traffic flowing via virtual traffic hubs, according to at least some embodiments.

FIG. 10 illustrates example programmatic interactions between clients and a packet processing service at which multiple route tables may be used to manage traffic flowing via virtual traffic hubs, according to at least some embodiments. One or more programmatic interfaces 1077 may be implemented by the packet processing service at which virtual traffic hubs are established in the depicted embodiment. Such interfaces may include, for example, a set of application programming interfaces (APIs) that are received by an API handler fleet 1078 of the PPS control plane in some embodiments. Interfaces 1077 may include graphical user interfaces, command line tools, web-based consoles and the like in at least one embodiments.

A client 1010 of the PPS 1012 may submit a CreateVTH request 1014 to initiate the process of configuring a VTH in the depicted embodiment. In response to the CreateVTH request, the PPS may provide a VTHID (VTH identifier) 1015 in some embodiments, indicating that the requested VTH has been created (e.g., that metadata representing the VTH has been stored).

To create a routing table of the VTH, a CreateVTHRoutingDomain request 1017 may be submitted via the interfaces 1077 in some embodiments. In at least one embodiment, there may be a 1:1 relationship between a routing domain and a route table, so the creation of a routing domain at the VTH may imply the creation and storage of a new route table in the VTH's metadata. A RoutingDomainID response 1019 may be transmitted by the PPS 1012 to the client in some embodiments. In one embodiment, a new route table with one or more entries may be passed as a parameter of the CreateVTHRoutingDomain request 1017. In some embodiments, a CreateRouteTable request (not shown in FIG. 10) may be submitted by a client, e.g., instead of a CreateVTHRoutingDomain request, to indicate that a new route table is to be included in the metadata of a specified VTH.

A client may submit a programmatic request (AttachIsolatedNetworkToVTH) 1021 to attach a specified isolated network (e.g., an IVN within the provider network at which the PPS 1012 is implemented, a VPN-connected network outside the provider network's data centers, or an external network connected to the provider network via a dedicated physical link) to a specified VTH in some embodiments, and receive an attachment identifier (AttachmentID) 1023 in response. Note that such a programmatic attachment may serve as a pre-requisite for subsequent association of the isolated network with a particular route table in at least some embodiments; in such embodiments, packets may not actually be routed from/to the isolated network by the VTH until the association operation is performed, even if the isolated network has been programmatically attached to the VTH. In other embodiments, the PPS may automatically associate a selected route table of the VTH (if an appropriate route table has been created) with the isolated network in response to an attachment request.

An association request (AssociateINWithRT) 1025 may be submitted by a client 1010 to indicate the particular route table of the VTH which is to be used to route at least a portion of traffic originating at a particular isolated network in the depicted embodiment. In some embodiments, as mentioned earlier, an association request 1025 may include an optional policy parameter or rule indicating one or more packet properties to be used to identify a subset of outbound packets of the particular isolated network that are to be routed using the specified table. Metadata indicating the association between the specified route table of the VTH and the isolated network may be stored at the PPS, and an association identifier (AssociationID) 1027 may be provided to the client in some embodiments. In at least some embodiments, after a route table has been programmatically associated with an isolated network, the VTH may begin routing traffic originating at the isolated network using the associated route table—e.g., decision master nodes of the VTH may begin generating actions using the associated route table, and action implementation nodes of the VTH may begin executing the generated actions to transmit packets received at the VTH towards their targeted destinations. Note that the associated route table may need to be populated with relevant entries (e.g., as a result of PropagateRoutesToRT requests of the kind discussed below) for packets to be routed correctly; if a packet is received at the VTH action implementation layer at a point in time at which there are no applicable route table entries in the associated route table for the packet, the packet may be dropped in at least some embodiments.

In some embodiments, a programmatic request (PropagateRoutesToRT) 1029 to propagate a specified set of one or more route table entries (e.g., entries whose destinations are within a particular isolated network attached to the VTH) to a specified route table of the VTH may be submitted by a client. The routes may be stored in the indicated table by the PPS control plane, and a RoutesPropagated message 1031 may be sent to the client to indicate that the requested entries. In at least one embodiment, in addition to or instead of using APIs (such as PropagateRoutesToRT) of the packet processing service, routing information exchange protocols similar to BGP (the Border Gateway Protocol) may be used to populate entries in the routing tables of VTHs. For example, in some embodiments, reachability/routing information pertaining to devices within a VPN-connected isolated network external to the provider network may be transmitted to the provider network using BGP or a similar protocol, and corresponding entries may be propagated into the route tables of one or more VTHs to which the isolated network is attached. Routing information pertaining to devices within the provider network may be transmitted/advertised to the external network as well using such protocols. In one implementation, routing information exchange protocol sessions (e.g., BGP sessions) may be established between an external network and a protocol processing device (e.g., a BGP endpoint or peer) within the provider network. Information received during at least a portion of such a session may be used to generate/obtain a route table entry, and the protocol processing device may use the packet processing service's programmatic interfaces (similar to PropagateRoutesToRT) to store/insert the route table entry at one or more VTH routing tables. In some embodiments, one or more nodes of a VTH may include a routing information exchange protocol processing engine configured to participate in such sessions. In at least one embodiment, such protocols may be used for obtaining route table entries for all the different types of isolated networks that may be attached to a VTH: e.g., route table entries may be obtained for a VTH, using one or more messages of a BGP-like protocol, representing destinations within isolated virtual networks (IVNs), within VPN-connected external networks, and/or within external networks connected to the provider network using direct physical links of the kind discussed above. From the perspective of a client of the packet processing service, a VTH may appear to include a routing information exchange protocol processing engine (e.g., similar to a BGP endpoint or peer) in at least some embodiments, so that the protocol may be used to propagate routing information to/from the VTH.

Note that a different combination of programmatic interactions may be supported in some embodiments for configuring VTHs with route tables than that shown in FIG. 10. For example, in one embodiment, several of the operations discussed may be performed in response to a single request instead of using separate requests: e.g., a combined request may be used to create a VTH and attach a set of isolated networks to it, a combined request for attachment and association may be submitted, and so on.

Methods of Using Multiple Route Tables at Virtual Traffic Hubs

Figure 11:
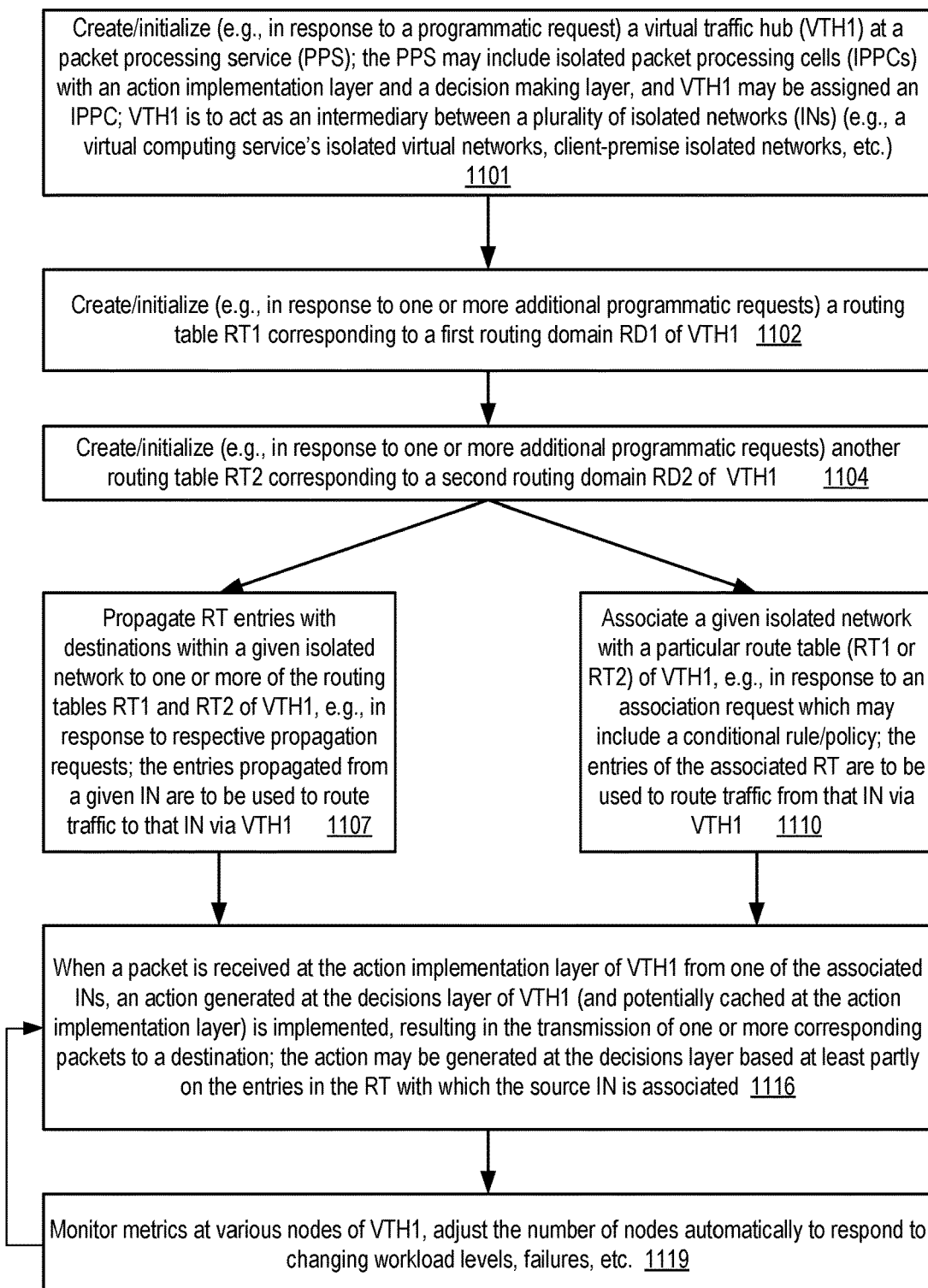
FIG. 11 is a flow diagram illustrating aspects of operations that may be performed to route traffic between isolated networks using a virtual traffic hub that utilizes multiple route tables, according to at least some embodiments.

FIG. 11 is a flow diagram illustrating aspects of operations that may be performed to route traffic between isolated networks using a virtual traffic hub that utilizes multiple route tables, according to at least some embodiments. As shown in element 1101, a virtual traffic hub VTH1 may be created at a packet processing service (PPS) (similar in features and functionality to the packet processing service discussed earlier in the context of FIG. 1 and FIG. 2). VTH1 may be created in response to a programmatic request submitted by a PPS client in at least some embodiments. The PPS may include isolated packet processing cells (IPPCs) of the kind discussed earlier, and a particular IPPC may be assigned to or designated for VTH1 in various embodiments. VTH1 may be created, for example, to act as a routing/forwarding intermediary between a plurality of isolated networks in some embodiments, including for example isolated virtual networks (IVNs) of a virtualized computing service (VCS) of a provider network at which the PPS is implemented, client-premise isolated networks connected to the provider network via VPN or dedicated physical links, and so on.

VTH1 may be configured to manage traffic of a plurality of routing domains in the depicted embodiment, with a respective route table being used for each routing domain. Individual ones of the routing domains may represent logical sub-groupings of operations performed at VTH1, e.g., with respective administrators granted permissions to modify metadata and/or policies associated with the different domains. A first route table RT1 corresponding to a first routing domain RD1 of VTH1 may be created (element 1102), e.g., in response to one or more programmatic requests from a client. Similarly, a second route table RT1 corresponding to a second routing domain RD2 may be created (element 1104), e.g., in response tone or more additional programmatic requests in the depicted embodiment.

At least two types of configuration operations may be performed with respect to RT1 and RT2 in the depicted embodiment to enable VTH1's nodes to start using the tables to process received packets from one or more isolated networks. As shown in element 1110, in the first type of operation, a given isolated network programmatically attached to VTH1 may be associated with a particular route table (RT1 or RT2), e.g., in response to one or more programmatic association requests. The programmatic association of a route table with an isolated network may imply that the entries of that route table are to be used at VTH1 to route packets received from that isolated network at VTH1's action implementation layer in various embodiments. In at least one embodiment, a given route table may be associated with only a subset of packets originating at a particular isolated network; for example, a programmatic association request may include a rule or policy indicating a subset of outbound packets that are to be routed using a specified route table.

A second type of operation may comprise propagating route table entries with destinations in a given isolated network to one or more of the tables RT1 or RT2 (element 1107), e.g., in response to one or more programmatic entry propagation requests. Such entries may be used at VTH1 to route packets towards the isolated network.

When a packet is received at the action implementation layer of VTH1 from one of the associated isolated networks, an action generated at the decisions layer of VTH1 (and potentially cached at the action implementation layer) may be implemented, resulting in the transmission of one or more corresponding packets to a destination (element 1116) in various embodiments. Such an action may be generated at the decisions layer based at least partly on the entries in the route table with which the source isolated network of the packet is associated in the depicted embodiment. Actions may be stored in executable form in caches at the action implementation layer in some embodiments, e.g., as byte code expressed using instructions of a register-based virtual machine optimized for implementing network processing operations, which can be used to perform operations similar to those of the extended Berkeley Packet Filter (eBPF) interface.

Over time, based on the client's needs, additional isolated networks may be attached and associated with VTH1, the set of resources at various attached isolated networks may grow or shrink, and/or other changes that may affect the packet processing being performed at VTH1 may change in at least some embodiments. Metrics (e.g., including packet processing latencies, throughputs, utilization levels of CPUs, memory, disk, network etc.) may be collected at various nodes of VTH1 (element 1119). The number of nodes at one or more layers of VTH1, such as the action implementation layer, the decisions layer and/or the administration layer, may be automatically adjusted to respond to changing conditions such as changing workload levels, node failures, the creation of new route tables, new associations/attachments and so on in the depicted embodiment.

Virtual Traffic Hubs Using Respective Regional Resource Collections

Figure 12:
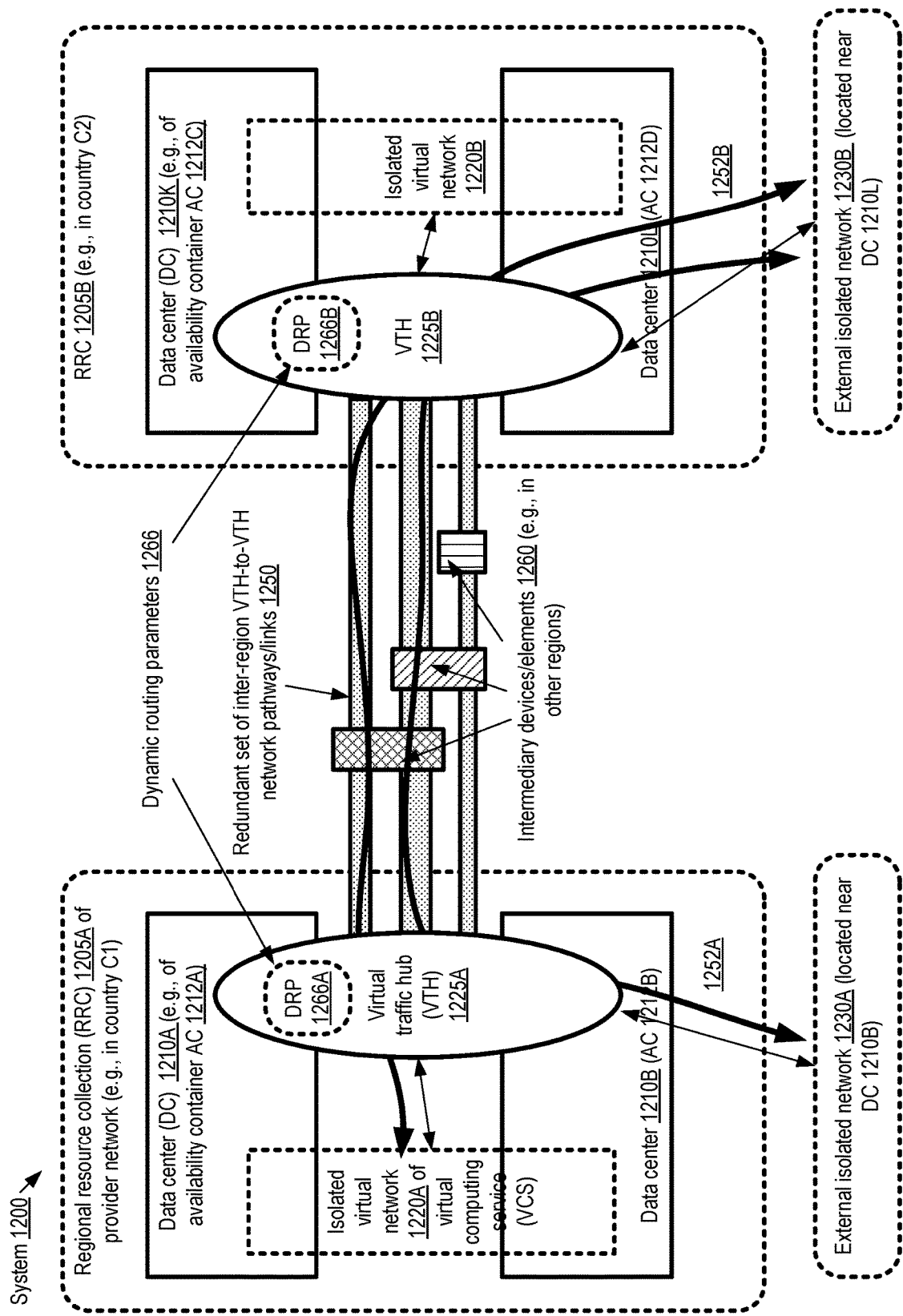
FIG. 12 illustrates an example system environment in which virtual traffic hubs set up in respective geographically separated regional resource collections of a provider network may be linked using multiple redundant pathways to enable dynamic routing of inter-region traffic, according to at least some embodiments.

FIG. 12 illustrates an example system environment in which virtual traffic hubs set up in respective geographically separated regional resource groups of a provider network may be linked using multiple redundant pathways to enable dynamic routing of inter-region traffic, according to at least some embodiments. In system 1200, a provider network may comprise a plurality of regional resource collections (RRCs) 1205, such as RRC 1205A and 1205B. A given RRC 1205 may itself comprise resources (e.g., computing devices, networking devices and links, storage devices, and the like) distributed among one or more data centers in some embodiments: for example, RRC 1205A may comprise resources at data center 1210A and 1210B, while RRC 1205B may comprise resources at data center 1210K and data center 1210L. The data canters 1210 of a particular RRC 1205 may be located relatively close to each other, but data centers of one RRC 1205 may in at least some cases be relatively distant from data centers of another RRC. For example, data centers 1210A and 1210B may be located within one country C1, while data centers 1210K and 1210L may be located within another country C2. The boundaries of RRCs may not necessarily coincide with those of countries or other political/civil entities in at least some embodiments: e.g., multiple RRCs may be set up within a single large country, or even within a single large state or city. In various embodiments, as discussed earlier, the resources of the provider network may also be organized into availability containers (ACs), and various types of applications or services (including for example the packet processing service at which virtual traffic hubs are established) may be implemented using resources spread over several availability containers to improve overall availability levels. In the embodiment depicted in FIG. 12, for example, at least some of the resources at data centers 1210A, 1210B, 120K and 1210D may belong respectively to ACs 1212A, 1212B, 1212C and 1212D of the provider network.

Some clients of provider networks may perform business activities in, or have employees and offices in, a variety of locations, e.g., in different countries or continents. For example, a multi-national firm may have offices in various locations in North America, Asia, Europe, Africa, and so on. For some types of tasks, such entities may wish to utilize the capabilities of provider networks in a location-independent manner—e.g., a firm may wish to have some computation tasks performed in Europe (where one set of the firm's employees and computing resources may be located), and results of the computation tasks be seamlessly transferred to North America (where another set of employees of the firm may be located at one or more offices). In some embodiments, region-level virtual traffic hubs (VTHs) may be established at the packet processing service, and linked to one another to help fulfill such requirements. For example, external isolated networks (located at customer data centers, offices and the like) that are located close to one RRC (e.g., RRC 1205A of FIG. 12) may be attached to a region-level VTH 1225A at RRC-A, and then linked by the provider network operator to another region-level VTH 1225B at a different RRC, RRC 1205B, near to where another external network (or isolated virtual network) of the same client may be located, enabling traffic to flow in a scalable fashion on behalf among various geographical locations.

According to at least some embodiments, a first regional virtual traffic hub such as 1225A (similar in features and capabilities to the VTHs discussed earlier) may be established, e.g., in response to one or more programmatic requests from a client of the provider network, using a first regional resource collection such as RRC 1205A. Routing actions generated at a decision making layer of the first regional VTH 1225A may be performed at an action implementation layer of the VTH 1225A. The VTH 1225A may comprise one or more nodes at two different availability containers such as AC 1212A and 1212B in some embodiments (e.g., using an approach similar to that illustrated in FIG. 8). A second region-level virtual traffic hub 1225B may be established, e.g., in response to one or more programmatic requests from the client, using a second regional resource collection such as RRC 1205B in the depicted embodiment. Routing actions generated at a decision making layer of the second regional VTH 1225B may be performed at an action implementation layer of the VTH 1225B. Like VTH 1225A, VTH 1225B may also comprise one or more nodes at two different availability containers such as AC 1212C and 1212D in some embodiments.

A number of isolated networks may be programmatically attached to individual ones of the regional VTHs 1225 in the depicted embodiments, e.g., in response to programmatic requests similar to those discussed earlier in the context of FIG. 10. For example, isolated virtual network (IVN) 1220A of a VCS of the provider network, as well as external isolated network 1230A (which may located close to data center 1210B) may be attached to VTH 1225A. Similarly, IVN 1220B and external isolated network 1230B may be programmatically attached to VTH 1225B. Other configuration operations, such as associations of the isolated networks with route tables of the VTHs, propagation of route table entries and so on may also be performed in various embodiments, e.g., in response to requests submitted using programmatic interfaces similar to those also discussed earlier.

In response to one or more programmatic requests (such as a hub linkage request indicating VTHs 1225A and 1225B), a plurality of network pathways 1250 to be used to transmit network packets between the pair of regional VTHs may be identified in at least some embodiments at the provider network, e.g., by control plane components of the packet processing service used for the VTHs. In at least one embodiment, a set of dynamic routing parameters (DRPs) 1266 that may be used to select the specific inter-RRC pathways for various network flows, such as DRPs 1266A and 1266B, may also be identified for the traffic that is to be transmitted between the VTHs. Several different VTH-to-VTH pathways 1250 may be identified to enable connectivity between a given pair of regional VTHs 1225 in some embodiments, providing redundancy in the event of pathway congestion, failures and the like. Depending on the distance between the RRC data centers, and the types of physical links that the provider network is able to utilize for the VTHs, a given pathway may include zero or more intermediary elements 1260 (e.g., at other RRCs, and/or at non-provider network data centers, network centers and the like) in various embodiments. Three pathways are shown by way of example in FIG. 12, with one passing through a single intermediary element, and the other two each passing through a pair of intermediary elements.

When a packet of a particular flow (distinguished from other flows by various parameters such as source and destination addresses, ports, etc.) is received at the action implementation layer of a given regional VTH 1225 from one of the isolated networks attached to the VTH, an action generated at the decisions layer based at least in part on the dynamic routing parameters (and/or based on other routing/forwarding metadata provided by a client) may be implemented at the action implementation layer in the depicted embodiment. The action may, for example, result in a transmission of contents of one or more network packets, corresponding to the received packet, to the action implementation layer of another regional virtual traffic hub along a first pathway of the plurality of network pathways. The first pathway may be selected from the plurality of network pathways based at least in part on one or more dynamic routing parameters. When the packet contents reach the destination VTH 1225 via the selected pathway, another action may be performed at the action implementation layer of the second VTH in the depicted embodiment. This second action (which may have been generated at the decisions layer of the second VTH) may result in a delivery of the packet contents to a destination within a second isolated network which is programmatically attached to the destination regional VTH. By linking the regional VTHs, the packet processing service may enable traffic to flow between distant isolated networks as easily (from the perspective of the client) as traffic between nearby isolated networks. For example, packets originating at external network 1230A attached to VTH 1225A may take path 1252A to external isolated network 1230B, and packets originating at external isolated network 1230B may take path 1252B to IVN 1220A.

In some embodiments, as indicated above, a client may submit a programmatic hub linkage request, identifying a pair of VTHs such as 1225A and 1225B between which connectivity is to be established. In at least one embodiment, instead of submitting separate requests to first create the regional VTHs and then link them, a client of a packet processing service may simply indicate a pair (or group) of isolated networks among which connectivity is to be established, and the service may take care of at least some of the lower level steps such as creating/configuring VTHs in the appropriate RRCs, linking them, and so on. Some of the steps that may have to be taken may require approval or participation by the client in some embodiments—e.g., the client may be consulted by the packet processing service to determine how many different route tables are to be set up at each VTH, which routes are to be propagated to which tables, and so on.

In at least some embodiments, as discussed below in further detail, a client may provide one or more inter-regional path preference indicators, e.g., specifying that packets between a given pair of isolated networks IN-A and IN-B either have to be passed through some specified intermediary device IDev of some RRC, specifying that packets between the given pair of isolated networks are not to flow across specified RRCs, specifying desired performance levels for inter-regional traffic, and so on. Such preferences may be taken into account when generating routing actions at the regional VTHs in various embodiments. A number of different types of metrics may be taken into account for dynamic routing in different embodiments, including for example (a) latency metrics associated with individual ones of the plurality of network pathways between RRCs, (b) bandwidth metrics associated with individual ones of the plurality of network pathways, (c) packet loss metrics associated with individual ones of the plurality of network pathways, or (d) flow count metrics associated with individual ones of the plurality of network pathways. In at least some embodiments, a client may be provided indications of pathways that are available for inter-region traffic between their isolated networks—e.g., the client may be informed that some paths between RRC-A and RRC-B pass through country C1, others through countries C2 and C3, and so on. In some embodiments, clients may be provided metrics for inter-region traffic (e.g., total number of packets transmitted via VTH-1 and VTH-2 between isolated network IN-A of RRC-A and IN-B of RRC-B, latencies for packets sent between IN-A and IN-B, etc.) separately from metrics for intra-region traffic (e.g., total number of packets transmitted via VTH-1 between isolated network IN-A of RRC-A and IN-C of RRC-A, latencies for packets sent between IN-A and IN-C, etc.), e.g., in response to programmatic requests for traffic metrics.

Global Managed Fabric with Region-Level Virtual Traffic Hubs

Figure 13:
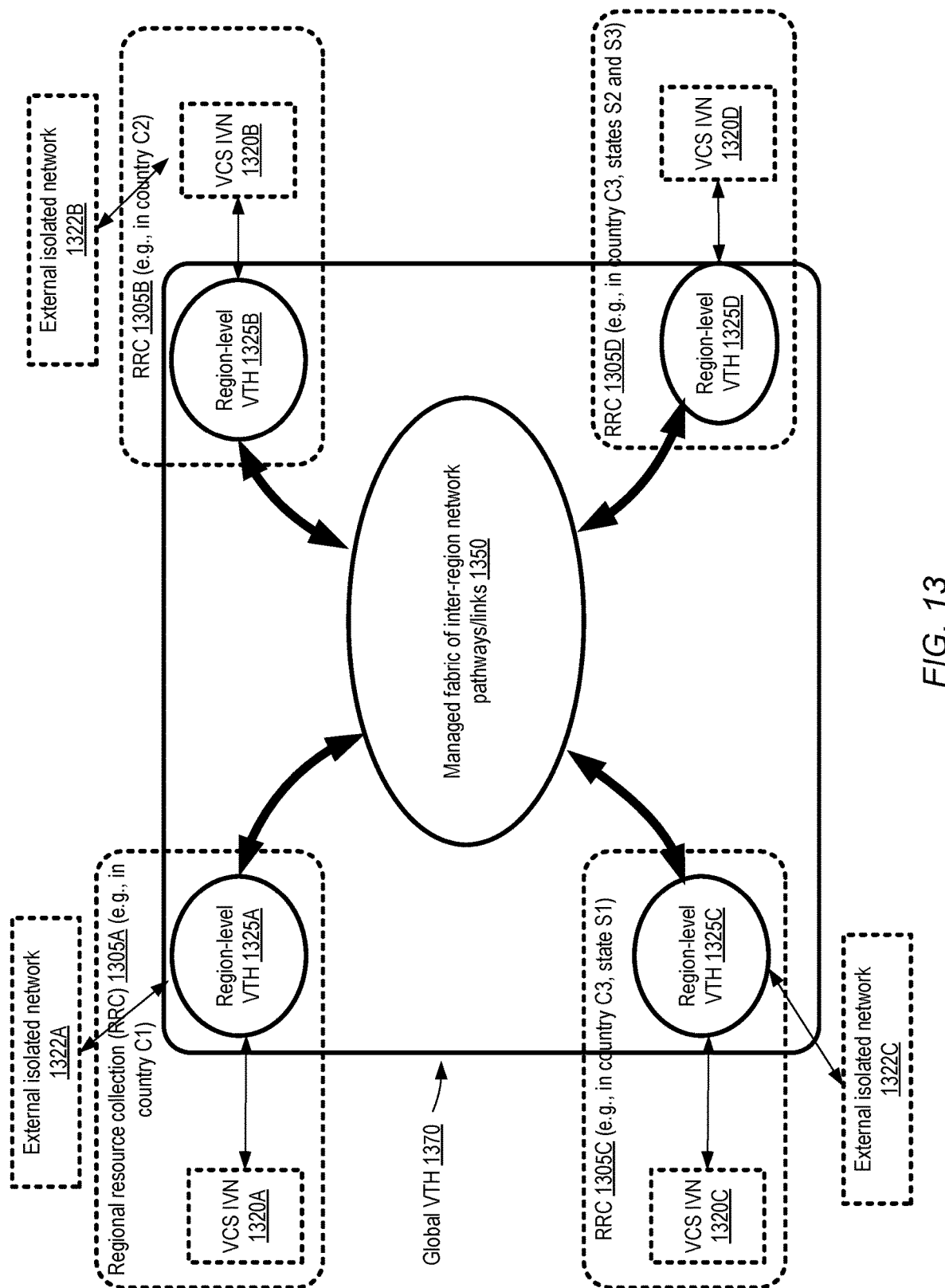
FIG. 13 illustrates an example global managed fabric linking region-level virtual traffic hubs, according to at least some embodiments.

FIG. 13 illustrates an example global managed fabric linking region-level virtual traffic hubs, according to at least some embodiments. In the depicted embodiment, a provider network's resources may comprise at least four regional resource collections (RRCs) 1305A-1305D. For example, RRC 1305A may comprise one or more data centers in a country C1, RRC 1305B may comprise one or more premises in country C2, RRC 1305C may include locations in state S1 of country C3, and RRC 1305D may comprise resources in states S2 and S3 of country C3. On behalf of a customer of the provider network, isolated virtual networks (IVNs) of a virtualized computing service (VCS) of the provider network may have been set up at each of the RRCs—e.g., VCS IVNs 1320A-1320D may have been established in RRCs 1305A-1305D respectively. Furthermore, in the depicted example scenario, the customer may also have one or more external isolated networks, such as 1322A-1322C, at premises outside the provider network's data centers. Such external isolated networks may be connected to the provider network, for example, using VPNs or dedicated physical links as discussed earlier.

In order to manage the routing of network traffic in a scalable manner between resources in various of the internal and external isolated networks, a respective region-level virtual traffic hub 1325, similar in features to VTH 102 of FIG. 1, may be configured within each of the RRCs 1305D in the depicted embodiment. For example, VTHs 1325A-1325D may be established in RRCs 1305A-1305D respectively. Depending, for example, on their relative proximity to an RRC, individual ones of the external isolated networks may be programmatically attached to one of the region-level VTHs in some embodiments—e.g., external isolated networks 1322A-1322C may be attached to VTHs 1325A-1325C respectively.

A dynamically scalable fabric of inter-region network pathways or links 1350, may be used to enable packets to flow at desired levels of performance and availability in various embodiments. The links of the fabric may be provisioned and managed (e.g., by adding/acquiring new fiber optic or other types of physical links, upgrading or otherwise changing the links and/or devices used) by the provider network operator, e.g., without requiring input from clients of the provider network on whose behalf the fabric is being used. Collectively, the combination of region-level VTHs 1325 and the pathways that connect them on behalf of a client may be considered a global VTH 1370 set up for the client in the depicted embodiment. For example, the client may submit a programmatic request indicating (e.g., via respective network identifiers or virtual network interface identifiers) a set of isolated networks that are to be connected to one another using VTHs, and the packet processing service may configure the required set of region-level VTHs as well as cross-region links in some embodiments. In such embodiments, the client may not even have to request the establishment of individual ones of the region-level VTHs, or request specific attachment, association or route propagation operations of the kind discussed earlier. The user experience of the client may thereby be made much smoother or easier than if the client had to issue multiple programmatic requests in such embodiments. Note that if non-default connectivity is required—e.g., if traffic to/from some of the internal or external isolated networks is to be restricted to flowing from/to specific ones of the other external isolated networks in the manner discussed in the context of FIG. 5, FIG. 6 or FIG. 7, the client may have to programmatically inform the packet processing services regarding such requirements in at least some embodiments.

Intermediary Management for Inter-Regional Traffic Using VTHs

Figure 14:
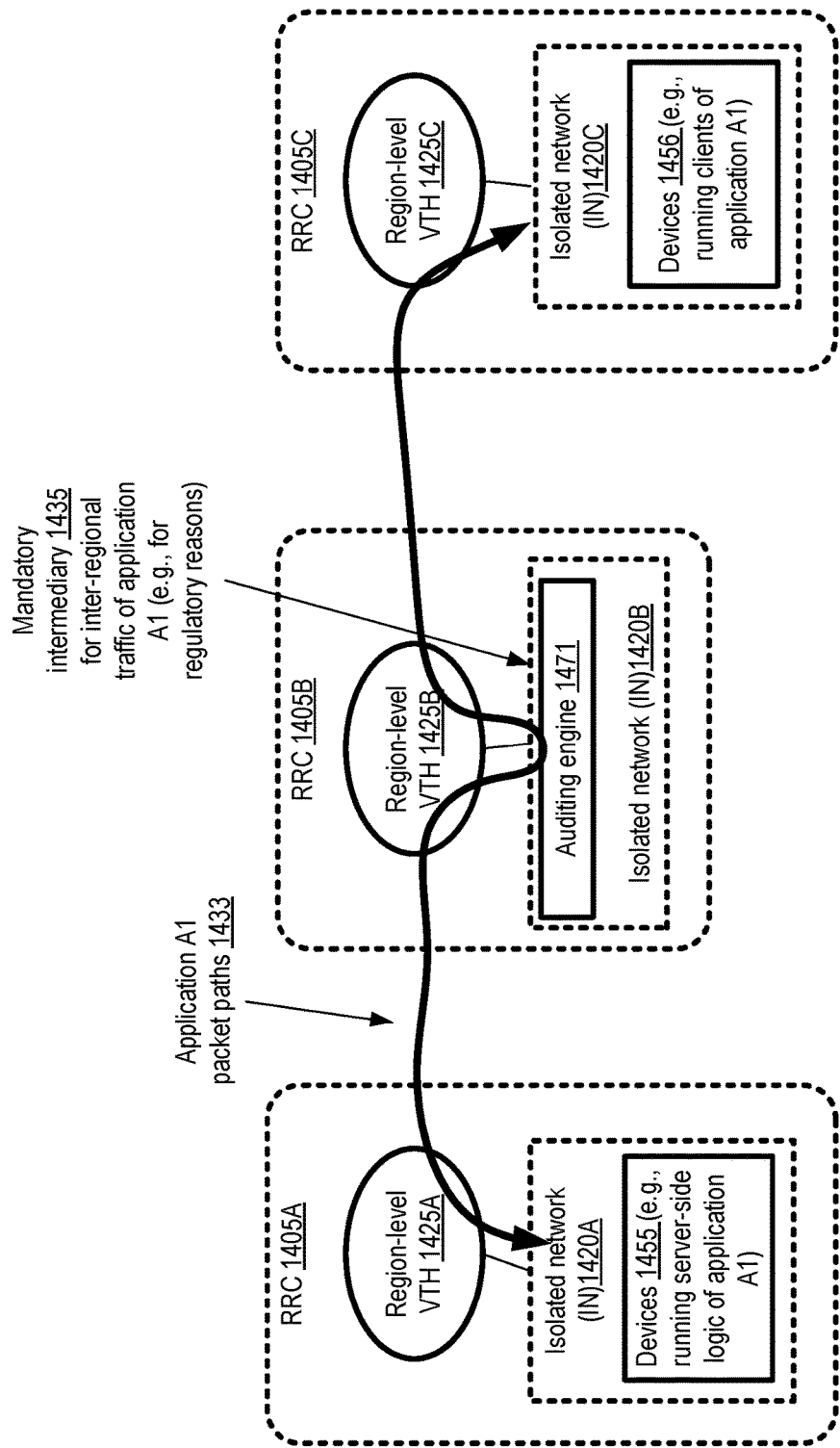
FIG. 14 illustrates an example mandatory intermediary for inter-regional network traffic managed using virtual traffic hubs, according to at least some embodiments.

In some embodiments, clients may have specific requirements or preferences regarding intermediaries along the paths taken for network packets flowing between regional resource collections. In some cases, for example for regulatory reasons, clients may wish to ensure that such packets are processed at particular intermediary devices; in other cases, clients may wish to ensure that such packets do not pass through particular RRCs. FIG. 14 illustrates an example mandatory intermediary for inter-regional network traffic managed using virtual traffic hubs, according to at least some embodiments. In the depicted embodiment, network traffic of one or more applications including an application A1 of a client is to flow between two isolated networks: IN 1420A in regional resource collection (RRC) 1405A, and IN 1420C in RRC 1405C. For example, a first set of devices 1455 implementing business logic or back-end operations of a web service application A1 may be located within IN 1420A, while a second set of devices 1456 at IN 1420C may run clients that submit requests to the server-side or back-end components of application A1 at IN 1420A and receive corresponding responses.

The client running application A1 may wish to ensure that all requests and/or responses of application A1 be logged and/or otherwise processed at an auditing engine 1471 that is located within an isolated network 1420B at an RRC 1405B in the depicted embodiment. As such, auditing engine 1435 may be designated, e.g., via a programmatic interface, as a mandatory intermediary 1435 for inter-regional traffic of application A1 in the depicted embodiment. Other types of auditing or logging intermediaries may be specified as requirements for inter-regional traffic in various embodiments. Respective region-level VTHs 1425A-1425C may be set up at the RRCs 1405A-1405C in some embodiments, and the isolated networks 1420A-1420C may be programmatically attached to the appropriate region-level VTHs. The client may specify, e.g., as a parameter of a request for linkage between VTH 1425A and VTH 1425C, that at least a subset of packets associated with application A1 be routed via the auditing engine 1471 at IN 1420B attached to VTH 1425B in the depicted embodiment. Such requirements may be stored as metadata at the control plane of the packet processing network, and passed on to the decision making nodes (e.g., of VTHs 1425A and 1425C) in some embodiments. When generating actions to be implemented for various network flows in such embodiments, the decision master nodes of the VTHs may take the requirement for passing the packets through the auditing engine 1435, e.g., via paths similar to 1433, into account. Note that while an auditing engine is provided as an example mandatory intermediary in FIG. 14, other types of mandatory intermediaries may be designated in various embodiments. For example, in some embodiments, the contents of the inter-region packets may be transformed in some way (e.g., using encryption algorithms) at mandatory intermediary devices/networks, billing-related operations may be performed at intermediaries, and so on.

Figure 15:
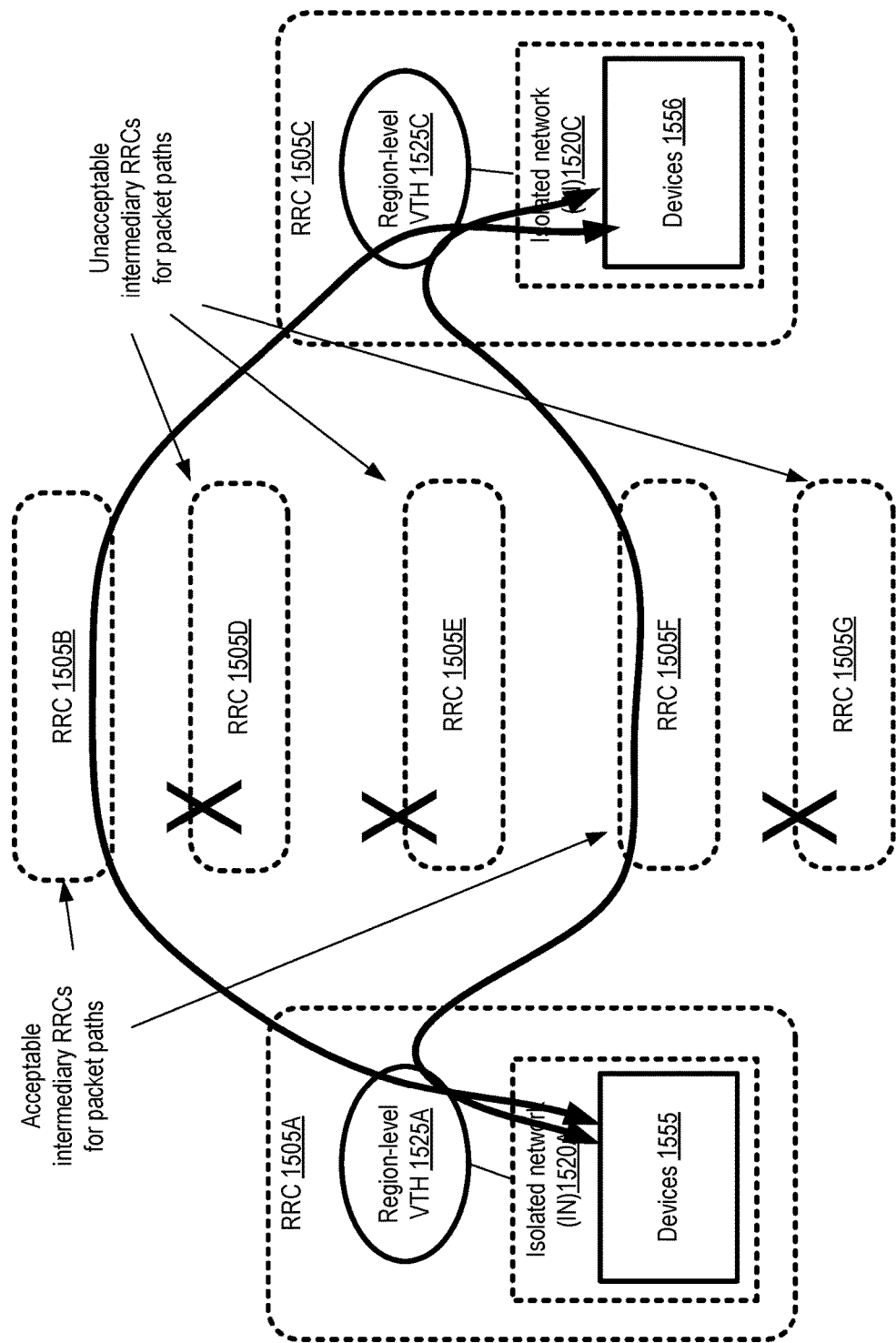
FIG. 15 illustrates examples of exclusions, based on client preferences, of intermediaries for network traffic managed using virtual traffic hubs, according to at least some embodiments.

In some embodiments, instead of (or in addition to) requiring that inter-region packets necessarily pass through specified intermediaries, clients may prefer that one or more intermediaries be excluded from the paths taken by inter-region packets. FIG. 15 illustrates examples of exclusions, based on client preferences, of intermediaries for network traffic managed using virtual traffic hubs, according to at least some embodiments. In the depicted embodiment, network traffic of one or more applications including an application A1 of a client is to flow between two isolated networks: IN 1520A in regional resource collection (RRC) 1505A, and IN 1520C in RRC 1505C. For example, a first set of devices 1555 implementing business logic or back-end operations of a web service application may be located within IN 1520A, while a second set of devices 1556 at IN 1520C may run clients that submit requests to the server-side or back-end components of application at IN 1520A and receive corresponding responses.

When transferring packets between RRC 1505A and RRC 1505B, a number of other RRCs such as 1505B, 1505D, 1505E, 1505F or 1505G may be available as intermediaries—for example, the RRCs 1505A and 1505C may be located in countries between which direct high-performance links are not available, while high-performance links to the intermediaries may be available from both RRCs 1505A and 1505C. Respective ones of the RRCs 1505A-1505G may, for example, comprise data centers located in different countries or different legal jurisdictions. From the perspective of a client on whose behalf network traffic is to flow between IN 1520A and 1520C, some of the possible intermediaries may be more acceptable than others. For example, as indicated by the "X" symbols, a client may not wish to have packets routed via RRCs 1505D, 1505E or 1505G, while routing packets via RRCs 1505B and/or 1505G may be acceptable. In some embodiments, clients may be provided an indication of potential intermediaries (e.g., a list of intermediary countries or data center locations corresponding to RRCs 1505B, and 1505C-1505H) for their inter-regional traffic, and the clients may indicate relative preferences for different ones of the intermediary RRCs. Such preferences may be taken into account at the packet processing control plane and/or at the decisions layers of regional VTHs such as VTH 1525A and 1525B set up in the source and destination RRCs in some embodiments. The actions generated at the decisions layers and executed at the action implementation layer may use inter-region routes that do not pass through non-preferred RRCs (or specific intermediary data centers/devices indicated as non-preferred), for example.

Programmatic Interactions for Inter-Region Traffic Management Using VTHs

Figure 16:
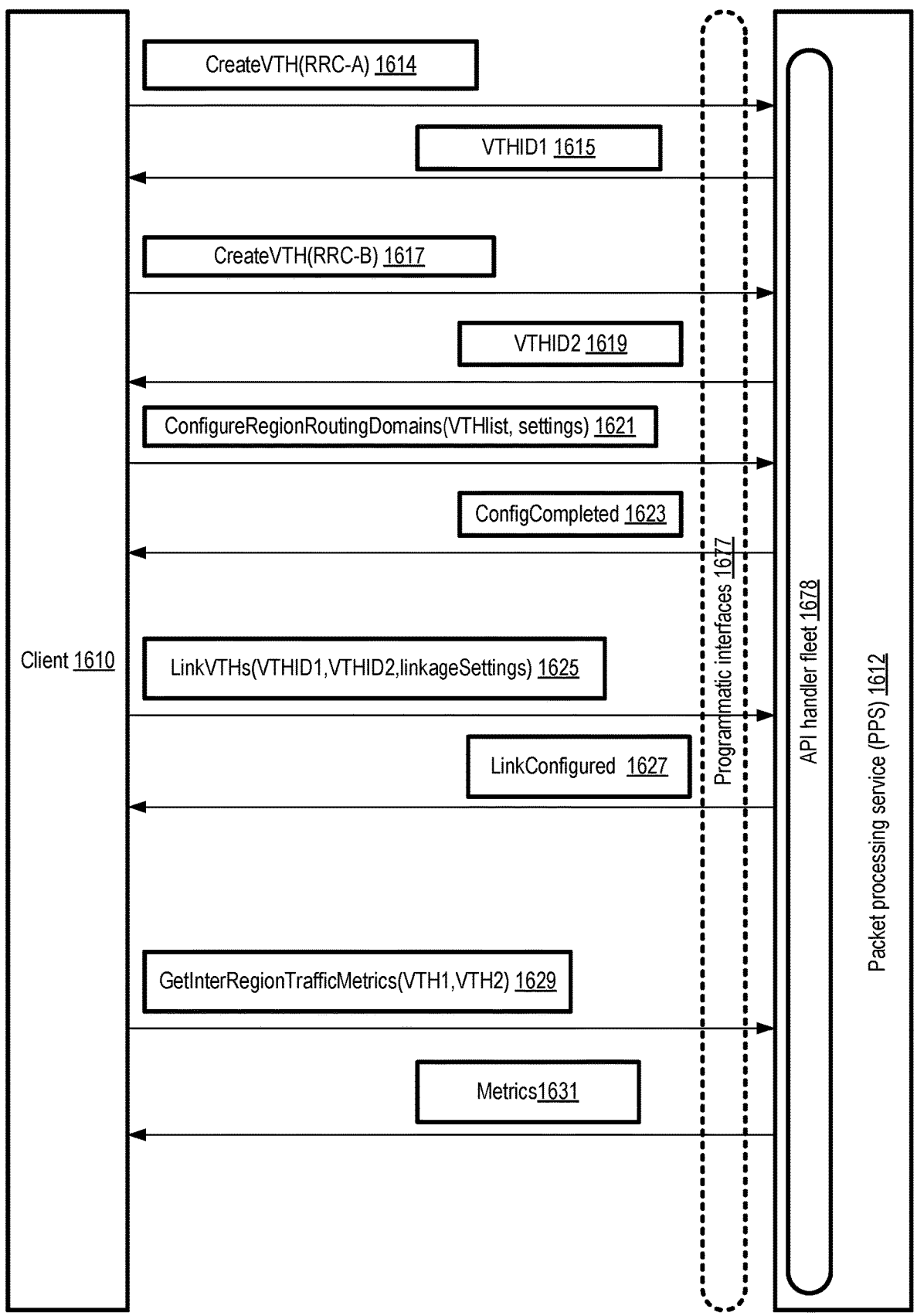
FIG. 16 and FIG. 17 collectively illustrates example programmatic interactions between clients and a packet processing service at which region-level virtual traffic hubs may be linked using dynamic routing and redundant pathways, according to at least some embodiments.
Figure 17:
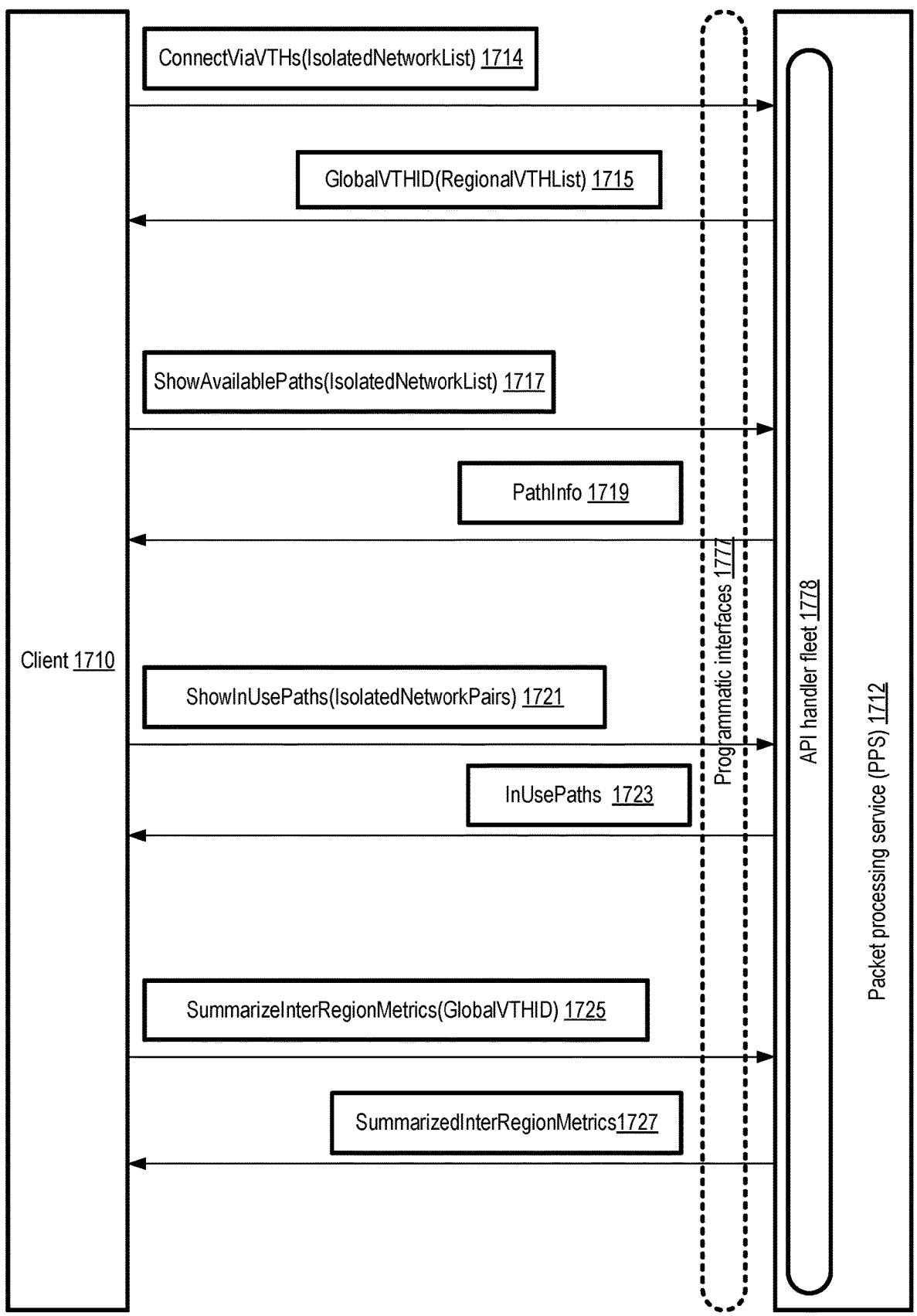

FIG. 16 and FIG. 17 collectively illustrates example programmatic interactions between clients and a packet processing service at which region-level virtual traffic hubs may be linked using dynamic routing and redundant pathways, according to at least some embodiments. A packet processing service 1612 may implement a variety of programmatic interfaces 1677 in the depicted embodiment, including for example a set of application programming interfaces (APIs) that may be processed initially at an API handler fleet 1678. Other types of programmatic interfaces such as web-based consoles, graphical user interfaces, command-line tools and the like may be implemented in some embodiments. A client 1610 may submit respective requests 1614 and 1617 via programmatic interfaces 1677 to create a pair of region-level virtual traffic hubs (VTHs) of the kind discussed earlier (e.g., in the context of FIG. 12) at regional resource groups RRC-A and RRC-B in the depicted embodiment. Respective identifiers of the VTHs may be provided in response to the creation requests, e.g., via messages 1615 and 1619.

In the embodiment depicted in FIG. 16, the client 1610 may first initiate region-level configuration operations at the VTHs, e.g., via one or more ConfigureRegionRoutingDomains programmatic requests 1621 (with the VTHList indicating the specific VTHs to be configured). One or more parameters of such requests (e.g., "settings") may be used, for example, to specify programmatic attachment of individual isolated networks to a respective region-level VTH, to create route tables, to associate route tables with the isolated networks, and/or to propagate route table entries to specified ones of the route tables in different embodiments. In some embodiments, several different programmatic interactions may be used to request such operations for each of the VTHs, instead of an individual request as shown in FIG. 16. The packet processing service may store metadata indicating the desired configurations and provide a response 1623 indicating that the configuration at the region level has been completed.

In at least one embodiment, a LinkVTHs request 1625 may be submitted by the client via programmatic interfaces 1677 to request that connectivity be established among two or more region-level VTHs. Such a request, which may be referred to as a hub linkage request, may indicate the identifiers of the region-level VTHs, as well as one or more parameters providing details of preferences/requirements for inter-region traffic (e.g., path preference indicators such as mandatory intermediaries of the kind discussed above, intermediaries that are to be excluded, performance objectives for inter-region traffic, dynamic routing parameters or factors to be taken into account when routing packets between the VTHs etc.) in at least some embodiments. In response to such a request, the packet processing service may identify/configure a set of one or more redundant pathways between the specified region-level VTHs that can satisfy the expressed preferences of the client, and determine and store dynamic routing parameters that are to be used for inter-regional traffic in such embodiments. A LinkConfigured message 1627 may be sent to the client to indicate that the regional VTHs have been linked in the depicted embodiment.

Traffic between isolated networks attached to the regional VTHs may then be permitted to flow, with actions being generated by the decision master nodes at each of the VTHs (and implemented at the action layers of the VTHs) to enable packets to be forwarded across the inter-RRC pathways in according with the dynamic routing parameters. Note that traffic may also be routed via a given VTH within the isolated networks of a given RRC, as well as across RRC boundaries in various embodiments—not all the traffic entering a given VTH may have to be sent to a different RRC. In at least some embodiments, a client may be able to obtain inter-region traffic metrics, e.g., by submitting a metrics request 1629 indicating the specific VTHs in the different regions of interest. In response, the packet processing service may provide the metrics 1631, e.g., indicating how many packets/second were transmitted in either direction between the linked regional VTHs, inter-region message latencies, packet drop rates and the like in the depicted embodiment.

In some embodiments, a client may not have to request the creation of individual VTHs to enable connectivity between isolated networks in different regions; instead, for example, a client may simply provide a list of isolated networks among which connectivity is desired, and the packet processing service may perform the tasks of establishing and configuring the required set of VTHs in the different regions. In the embodiment depicted in FIG. 17, for example, a client may submit a ConnectViaVTHs programmatic request 1714 via programmatic interfaces 1777 of a packet processing service (PPS) 1712, identifying a list of isolated networks (via the IsolatedNetworkList parameter) to be linked using VTHs. Programmatic interfaces 1777 may include, for example, a set of APIs processed initially at an API handler fleet 1778 of the packet processing service, command-line tools, graphical user interfaces, web-based consoles and the like. In response to the ConnectViaVTHs request, in some embodiments, a logical construct called a global VTH (similar to global VTH 1370 discussed in the context of FIG. 13) may be generated, and an identifier of the global VTH may be provided to the client via message 1715. The global VTH may comprise a set of region-level VTHs that are created by the packet processing service, e.g., with one or more VTHs being established in each of several regional resource collections or RRCs (similar to RRCs 1205 of FIG. 12), such that individual ones of the set of isolated networks specified in the ConnectViaVTHs request are attached programmatically to one of the regional VTHs. In at least some embodiments, information about the region-level VTHs underlying the global VTH may be provided to the client, e.g., via a RegionalVTHList parameter of the response message 1715. In effect, in various embodiments, operations performed at the PPS in response to the ConnectViaVTHs request may be logically analogous to those performed in response to the combination of CreateVTH requests, ConfigureRegionRoutingDomains requests and LinkVTHs requests discussed in the context of FIG. 16.

In some embodiments, a client may obtain information about alternative pathways that may be available for network traffic between isolated networks (which may be configured within different regional resource collections, and/or programmatically attached to VTHs within different regional resource collections). A ShowAvailablePaths request 1717 may be submitted programmatically to obtain such information regarding a list of isolated networks (IsolatedNetworkList) in the embodiment depicted in FIG. 17. In response, the PPS 1712 may provide an indication of the paths in a PathInfo message 1719 in some embodiments. In at least some embodiments, a graphical representation of the available paths may be provided, indicating intermediary VTHs, intermediary RRCs and/or intermediary networking devices between various pairs of the isolated networks. Such information may be used by clients to specify acceptable and/or required intermediaries such as those discussed in the context of FIG. 14 and FIG. 15 in at least some embodiments.

According to one embodiment, a client 1710 may submit a ShowInUsePaths request via programmatic interfaces 1777 to a PPS 1712, indicating one or more pairs of isolated networks via a IsolatedNetworkPairs parameter. In response, the PPS may provide an indication (e.g., via an InUsePaths message 1723) of the intermediary regional VTHs, intermediary RRCs and/or other intermediary network devices that are being used for traffic flowing between the pairs of isolated networks.

In at least some embodiments, a client 1710 may submit a request 1725 to summarize inter-region traffic metrics associated with a global VTH via programmatic interfaces 1777. In response, the PPS may provide a summary 1727 of metrics such as the number of packets/second transmitted in either direction between linked regional VTHs underlying the global VTH, inter-region message latencies, packet drop rates and the like in the depicted embodiment. In at least one embodiment, the metrics for intra-region traffic processed at various ones of the region-level VTHs may also be obtained, e.g., in response to a similar SummarizeIntraRegionMetrics request.

Methods for Enabling Connectivity Via Linked Region-Level VTHs

Figure 18:
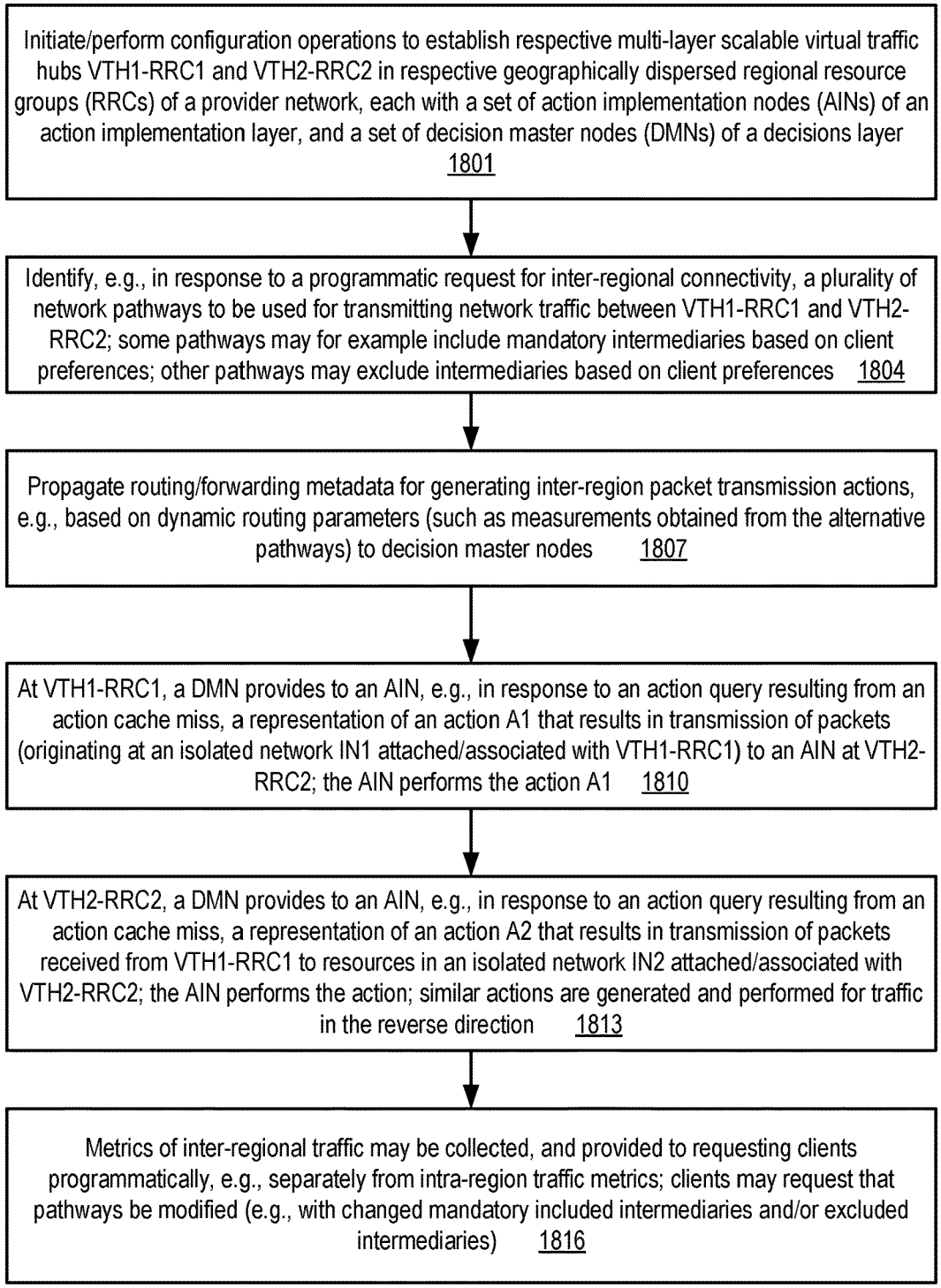
FIG. 18 is a flow diagram illustrating aspects of operations that may be performed to configure and use linked region-level virtual traffic hubs, according to at least some embodiments.

FIG. 18 is a flow diagram illustrating aspects of operations that may be performed to configure and use linked region-level virtual traffic hubs, according to at least some embodiments. As shown in element 1801, a set of configuration operations to establish respective multi-layer scalable virtual traffic hubs VTH1-RRC1 and VTH2-RRC2 in respective geographically dispersed regional resource groups (RRCs) of a provider network may be initiated/performed in the depicted embodiment. Individual ones of the VTHs may include a set of action implementation nodes (AINs) of an action implementation layer and a set of decision master nodes (DMNs) of a decisions layer, similar in functionality and capabilities to the AINs and DMNs discussed earlier.

A plurality of network pathways to be used for transmitting network traffic between VTH1-RRC1 and VTH2-RRC2 may be identified in various embodiments (element 1804), e.g., in response to a programmatic request for inter-region connectivity. Some pathways may, for example, include mandatory intermediaries based on client preferences; other pathways may exclude intermediaries based on client preferences. Routing/forwarding metadata for generating inter-region packet transmission actions, e.g., using dynamic routing parameters which may be dependent on metrics/measurements obtained from the different pathways, may be propagated to the decision master nodes of the VTHs VTH1-RRC1 and VTH2-RRC2 in various embodiments (element 1807).

At VTH1-RRC1, a DMN may provide a representation of an action A1 to an AIN, e.g., in response to an action query resulting from an action cache miss (element 1810) in the depicted embodiment. Implementation of the action A1 at the AIN may results in transmission of packets (e.g., packets originating at an isolated network IN1 attached to or associated with VTH1-RRC1) to an AIN at VTH2-RRC2. At VTH2-RRC2, a DMN may similarly provide a representation of an action A2 to an AIN, e.g., in response to an action query resulting from an action cache miss (element 1813).

When the AIN at VTH2-RRC2 performs A2, this may result in transmission of packets received from VTH1-RRC1 to resources in an isolated network IN2 associated with VTH2-RRC2. Similar actions may be generated and performed for traffic in the reverse direction (from isolated networks attached/associated with VTH2-RRC2, to isolated networks attached/associated with VTH1-RRC1) in the depicted embodiment. Metrics of inter-regional traffic may be collected, and provided to requesting clients programmatically, e.g., separately from intra-region traffic metrics in various embodiments (element 1819). In at least some embodiments, clients may request that pathways used for their inter-RRC traffic be modified (e.g., with changed mandatory included intermediaries and/or excluded intermediaries).

It is noted that in various embodiments, at least some operations other than those illustrated in the flow diagrams of FIG. 11 and/or FIG. 18 may be used to implement the packet processing-related techniques described above. Some of the operations shown may not be implemented in some embodiments or may be implemented in a different order, or in parallel rather than sequentially.

Use Cases

The techniques described above, of using scalable multi-layer virtual traffic hubs to provide easy-to-configure connectivity between various types of isolated networks may be useful in a variety of scenarios. As more and more distributed applications are migrated to provider network environments, especially environments in which isolated virtual networks can be established for different clients, the need for efficient and fault-tolerant management of packet routing and forwarding operations is also increasing. The use of multiple route tables at a single virtual traffic hub, with respective tables being associated with individual isolated networks for outbound traffic of the isolated networks, while specified route table entries are propagated to desired ones of the tables for inbound traffic, may enable customized asymmetric as well as symmetric hub-and-spoke configurations to be set up cleanly and efficiently. Such configurations may enable for example, disjoint silos of interconnected networks to be set up using a single hub, efficient sharing of edge resources of a provider network from different isolated networks, enhancement of network security using intermediary appliances, and the like. Customized global-level connectivity, e.g. using regional virtual traffic hubs that implement dynamic routing between isolated networks set up on behalf of the same client in different countries or continents, may be configured easily (e.g., with preferred or excluded intermediaries) based on the needs of provider network clients. The overall responsiveness of applications that utilize the packet processing operations may be improved, e.g., by quickly adding packet processing resources as the application workload increases.

Illustrative Computer System

Figure 19:
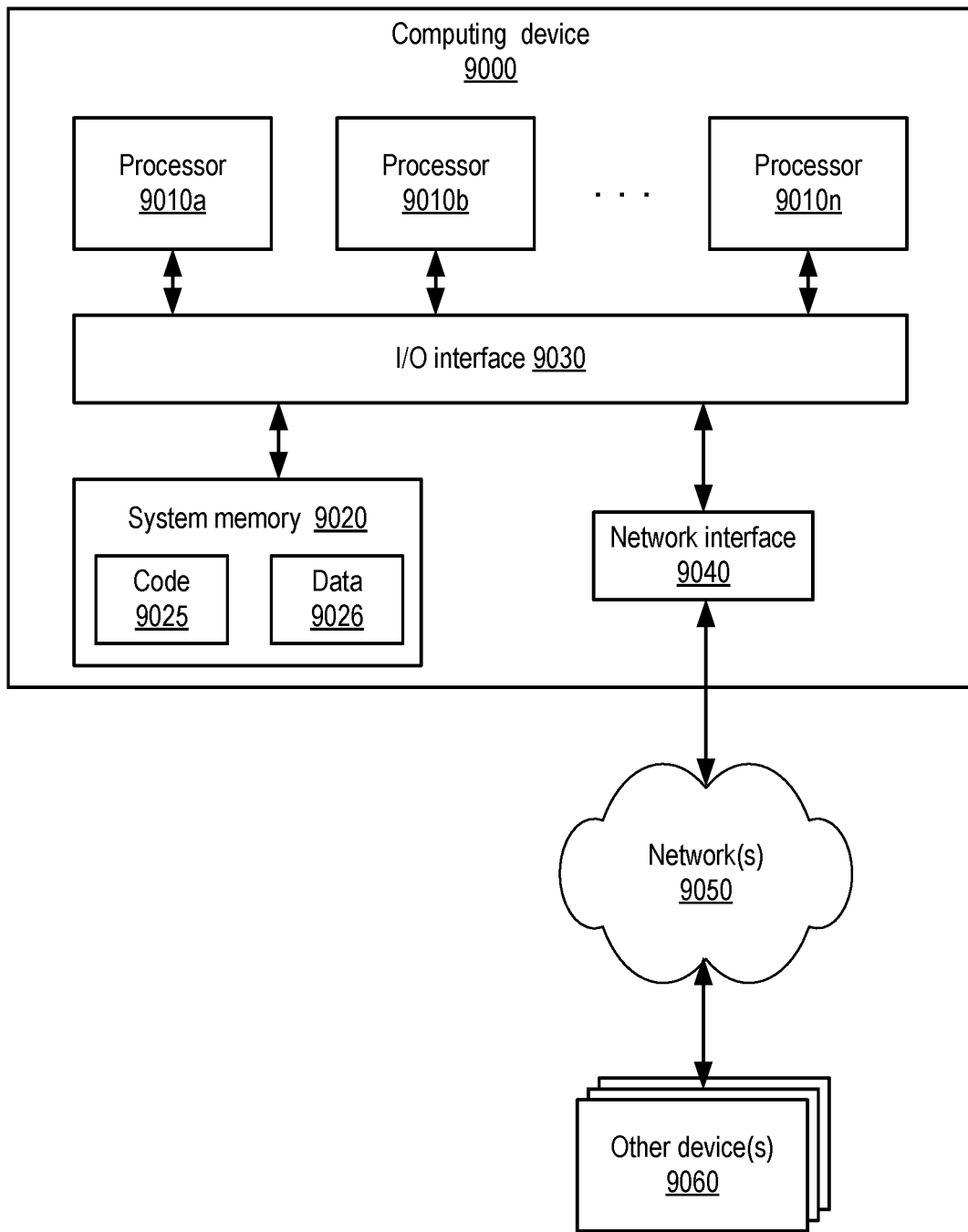
FIG. 19 is a block diagram illustrating an example computing device that may be used in at least some embodiments.

In at least some embodiments, a server that implements a portion or all of one or more of the technologies described herein, including the various data plane and control plane components of packet processing services and client-side devices that may interact programmatically with such services, may include a general-purpose computer system that includes or is configured to access one or more computer-accessible media. FIG. 19 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG.

1 through FIG. 18, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 18 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 19 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of a packet processing service of a provider network organized as a plurality of regional resource collections including a first regional resource collection and a second regional resource collection, wherein the first regional resource collection includes resources located at a first set of one or more data centers, and wherein the second regional resource collection includes resources located at a second set of one or more data centers;
   wherein the one or more computing devices include instructions that upon execution on a processor cause the one or more computing devices to:
      establish a first regional virtual traffic hub using the first regional resource collection, wherein routing actions generated at a decision making layer of the first regional virtual traffic hub are performed at an action implementation layer of the first regional virtual traffic hub;
      establish a second regional virtual traffic hub using the second regional resource collection, wherein routing actions generated at a decision making layer of the second regional virtual traffic hub are performed at an action implementation layer of the second regional virtual traffic hub;
      identify a plurality of network pathways and a plurality of dynamic routing parameters to be used to transmit network packets between the first regional virtual traffic hub and the second regional virtual traffic hub;
      perform a first action at the action implementation layer of the first regional virtual traffic hub, wherein the first action results in a transmission of contents of a network packet to the action implementation layer of the second regional virtual traffic hub along a first pathway of the plurality of network pathways, wherein the network packet is received from a first isolated network which is programmatically attached to the first regional virtual traffic hub, and wherein the first pathway is selected from the plurality of network pathways based at least in part on the one or more dynamic routing parameters; and
      perform a second action at the action implementation layer of the second regional virtual traffic hub, wherein the second action results in a delivery of the contents of the network packet to a destination within a second isolated network which is programmatically attached to the second regional virtual traffic hub.

2. The system as recited in claim 1, wherein the plurality of network pathways are identified in response to obtaining a hub linkage request via a programmatic interface.

3. The system as recited in claim 1, wherein the one or more computing devices include further instructions that upon execution on a processor further cause the one or more computing devices to:
   in response to obtaining an indication that a network linkage request has been submitted via a programmatic interface, wherein the network linkage request indicates the first and second isolated networks, establish the first and second regional virtual traffic hubs.

4. The system as recited in claim 1, wherein the one or more computing devices include further instructions that upon execution on a processor further cause the one or more computing devices to:
 obtain a path preference indicator via a programmatic interface, wherein the first pathway is selected from the plurality of network pathways based at least in part on the path preference indicator.

5. The system as recited in claim 1, wherein the dynamic routing parameters comprise one or more of: (a) latency metrics associated with individual ones of the plurality of network pathways, (b) bandwidth metrics associated with individual ones of the plurality of network pathways, (c) packet loss metrics associated with individual ones of the plurality of network pathways, or (d) flow count metrics associated with individual ones of the plurality of network pathways.

6. A method, comprising:
 performing, at one or more computing devices:
  identifying a plurality of network pathways usable to transmit network packets between a first regional virtual traffic hub of a provider network and a second regional virtual traffic hub of the provider network, wherein the first regional virtual traffic hub comprises one or more resources located at a first set of data centers, and wherein the second regional virtual traffic hub comprises one or more resources located at a second set of data centers;
  performing a first action at the first regional virtual traffic hub, wherein the first action results in a transmission of contents of a network packet to the second regional virtual traffic hub along a first pathway of the plurality of network pathways, wherein the network packet is received at the first regional virtual traffic hub from a first isolated network, and wherein the first pathway is selected from the plurality of network pathways based at least in part on one or more dynamic routing parameters; and
  performing a second action at second regional virtual traffic hub, wherein the second action results in a delivery of the contents of the network packet to a destination within a second isolated network.

7. The method as recited in claim 6, wherein the identification of the plurality of network pathways is responsive to obtaining a hub linkage request via a programmatic interface.

8. The method as recited in claim 6, further comprising performing, at the one or more computing devices:
 in response to obtaining an indication that a network linkage request has been submitted via a programmatic interface, wherein the network linkage request indicates the first and second isolated networks, establishing the first and second regional virtual traffic hubs.

9. The method as recited in claim 6, further comprising performing, at the one or more computing devices:
 obtaining a path preference indicator via a programmatic interface, wherein the first pathway is selected from the plurality of network pathways based at least in part on the path preference indicator.

10. The method as recited in claim 9, wherein the path preference indicator includes one or more intermediary path elements that are to be excluded from a pathway over which packets are transmitted between the first isolated network and the second isolated network.

11. The method as recited in claim 9, wherein the path preference indicator includes one or more intermediary path elements that are to be included in a pathway over which packets are transmitted between the first isolated network and the second isolated network.

12. The method as recited in claim 11, wherein a first intermediary path element of the one or more intermediary path element comprises an auditing or logging resource at a third set of one or more data centers.

13. The method as recited in claim 6, wherein the dynamic routing parameters comprise one or more of: (a) latency metrics associated with individual ones of the plurality of network pathways, (b) bandwidth metrics associated with individual ones of the plurality of network pathways, (c) packet loss metrics associated with individual ones of the plurality of network pathways, or (d) flow count metrics associated with individual ones of the plurality of network pathways.

14. The method as recited in claim 6, further comprising performing, at the one or more computing devices:
 in response to a metrics request, providing, via a programmatic interface, a respective indication of one or more of: (a) an inter-region traffic metric associated with network packets processed at the first regional virtual traffic hub or (b) an intra-region traffic metric associated with network packets processed at the first regional virtual traffic hub.

15. The method as recited in claim 6, further comprising performing, at the one or more computing devices:
 in response to a pathway description request, providing, via a programmatic interface, a respective indication of one or more network pathways of the plurality of network pathways.

16. Non-transitory computer-accessible storage media storing program instructions that when executed on one or more processors cause one or more computer systems to:
 identify a plurality of network pathways to transmit network packets between a first regional virtual traffic hub of a provider network and a second regional virtual traffic hub of the provider network, wherein the first regional virtual traffic hub comprises one or more resources located at a first set of data centers, and wherein the second regional virtual traffic hub comprises one or more resources located at a second set of data centers;
 cause a first action to be performed at the first regional virtual traffic hub, wherein the first action results in a transmission of contents of a network packet to the second regional virtual traffic hub along a first pathway of the plurality of network pathways, wherein the network packet is received at the first regional virtual traffic hub from a first isolated network, and wherein the first pathway is selected from the plurality of network pathways based at least in part on one or more dynamic routing parameters; and
 cause a second action to be performed at second regional virtual traffic hub, wherein the second action results in a delivery of the contents of the network packet to a destination within a second isolated network.

17. The non-transitory computer-accessible storage media as recited in claim 16, wherein the identification of the plurality of network pathways is responsive to a hub linkage request obtained via a programmatic interface.

18. The non-transitory computer-accessible storage media as recited in claim 16, further storing program instructions that when executed on one or more processors further cause the one or more computer systems to:
 in response to obtaining an indication that a network linkage request has been submitted via a programmatic interface, wherein the network linkage request indicates the first and second isolated networks, establish the first and second regional virtual traffic hubs.

19. The non-transitory computer-accessible storage media as recited in claim 16, further storing program instructions that when executed on one or more processors further cause the one or more computer systems to:
obtain an inter-region path preference indicator via a programmatic interface, wherein the first pathway is selected from the plurality of network pathways based at least in part on the inter-region path preference indicator.

20. The non-transitory computer-accessible storage media as recited in claim 16, wherein an isolated network of the first and second isolated networks comprises one or more of: (a) an isolated virtual network of a virtualized computing service, (b) a private network external to the provider network, connected to the provider network via a VPN (Virtual Private Network) tunnel, or (c) a private network external to the provider network, connected to the provider network via a dedicated physical link.

* * * * *